United States Patent [19]
Lang et al.

[11] Patent Number: 5,867,799
[45] Date of Patent: Feb. 2, 1999

[54] INFORMATION SYSTEM AND METHOD FOR FILTERING A MASSIVE FLOW OF INFORMATION ENTITIES TO MEET USER INFORMATION CLASSIFICATION NEEDS

[76] Inventors: Andrew K. Lang, 5702 Darlington Ave., Apt. #2, Pittsburgh, Pa. 15217; Donald M. Kosak, 415 Ohio River Blvd., Pittsburgh, Pa. 15202

[21] Appl. No.: 627,436

[22] Filed: Apr. 4, 1996

[51] Int. Cl.⁶ .................................................... G06F 17/30
[52] U.S. Cl. .................................................. 707/1; 707/10
[58] Field of Search .................................... 395/603, 605, 395/610, 149, 66; 348/7; 364/419.19, 192; 707/1, 10

[56] References Cited

U.S. PATENT DOCUMENTS

| | | | |
|---|---|---|---|
| 5,019,961 | 5/1991 | Addesso et al. | 364/192 |
| 5,117,349 | 5/1992 | Tirfing et al. | 395/605 |
| 5,249,262 | 9/1993 | Baule | 395/66 |
| 5,471,610 | 11/1995 | Kawaguchi et al. | 395/603 |
| 5,537,586 | 7/1996 | Amram et al. | 395/605 |
| 5,544,049 | 8/1996 | Henderson et al. | 364/419.19 |
| 5,563,998 | 10/1996 | Yaksich et al. | 395/149 |
| 5,563,999 | 10/1996 | Yaksich et al. | 395/149 |
| 5,608,447 | 3/1997 | Farry et al. | 348/7 |
| 5,649,186 | 7/1997 | Ferguson | 395/610 |

OTHER PUBLICATIONS

Knowles, Software Agent Technoly Delivers Customized Information for BBN's PIN, Dialogue, pp. 62–63, May 1995.

Resnick et al, Open Archeticture for Collaboration Filtering of Netnews, IDS, pp. 1–12, Mar. 1994.

Goldberg et al, Using Collaborative Filtering to Weave an Information Tapestry, IDS, pp. 61–70, Dec. 1992.

Sheth, Learning Approach to Personalized Information Filtering, IDS, pp. 1–74, Feb. 1994.

Susan Dumais, et al. *Using Latent Semantic Analysis to Improve Access to Textual Information.* In *Proceedings of CHI–88 Conference on Human Factors in Computing Systems.* (1988, New York: ACM).

David Evans et al. *A Summary of the CLARIT Project.* Technical Report, Laboratory for Computational Linguistics, Carnegie–Mellon University, Sep. 1991.

G. Fischer and C. Stevens. *Information Access in Complex, Poorly Structured Information Spaces.* In *Proceedings of CHI–91 Conference on Human Factors in Computing Systems.* (1991: ACM).

D. Goldberg, et al. *Using Collaborative Filtering to Weave an Information Tapestry. Communications of the ACM,* 35, 12 (1992), pp. 61–70.

(List continued on next page.)

*Primary Examiner*—Thomas G. Black
*Assistant Examiner*—Frantz Coby
*Attorney, Agent, or Firm*—Morgan, Lewis & Bockius LLP

[57] ABSTRACT

An apparatus, method, and computer program product for information filtering in a computer system receiving a data stream from a computer network, the data stream having raw informons embedded therein, at least one of the raw informons being of interest to a user, the user being a member client of a community. The method includes the steps of providing a dynamic informon characterization having profiles encoded therein, including an adaptive content profile and an adaptive collaboration profile; adaptively filtering the raw informons responsive to the dynamic informon characterization, and producing a proposed informon; presenting the proposed informon to the user; receiving a feedback profile from the user, responsive to the proposed informon; adapting the adaptive content profile, the adaptive collaboration profile, or both responsive to the feedback profile; and updating the dynamic informon characterization responsive to the previous adapting step. The apparatus includes a plurality of processors for providing interactive, distributed filtering of information, extracted from a computer network data stream in response to multiple attribute profiles.

138 Claims, 7 Drawing Sheets

OTHER PUBLICATIONS

Simon Haykin. *Adaptive Filter Theory.* Prentice–Hall, Englewood Cliffs, NJ (1986), pp. 100–380.

Simon Haykin. *Neural Networks: A Comprehensive Foundation.* Macmillan College Publishing Co., New York (1994), pp. 18–589.

Yezdi Lashkari, et al. *Collaborative Interface Agents.* In *Conference of the American Association for Artificial Intelligence.* Seattle, WA, Aug. 1994.

Paul Resnick, et al. *GroupLens: An Open Architecture for Collaborative Filtering of Netnews.* In *Proceeding of ACM 1994 Conference on Computer Supported Cooperative Work.* (1994: ACM), pp. 175–186.

Anil Rewari, et al. *AI Research and Applications In Digital's Service Organization. AI Magazine:* 68–69 (1992).

J. Rissanen. *Modelling by Shortest Data Description, Automatica,* 14:465–471 (1978).

Gerard Salton. *Developments in Automatic Text Retrieval. Science,* 253:974–980, Aug. 1991.

C. E. Shannon. *A Mathematical Theory of Communication. Bell Sys. Tech. Journal,* 27:379–423 (1948).

Beerud Sheth. *A Learning Approach to Personalized Information Filtering,* Master's Thesis, Massachusetts Institute of Technology, Feb., 1994.

F. Mosteller, et al. *Applied Bayesian and Classical Inference: The Case of the Federalist Papers. Springer–Verlag,* New York (1984), pp. 65–66.

T.W. Yan et al. *Index Structures for Selective Dissemination of Information.* Technical Report STAN–CS–92–1454, Stanford University (1992).

Yiming Yang. *An Example–Based Mapping Method for Text Categorization and Retrieval. ACM Transactions on Information Systems.* vol. 12, No. 3, Jul. 1994, pp. 252–277.

INFORMATION SYSTEM AND METHOD FOR FILTERING A MASSIVE FLOW OF INFORMATION ENTITIES TO MEET USER INFORMATION CLASSIFICATION NEEDS

BACKGROUND OF THE INVENTION

1. Field of the Invention

This invention relates to an apparatus, method, and computer program product for information filtering, in a computer system receiving a data stream from a computer network.

2. Description of the Relevant Art

Recent developments in computer networking, particularly with regard to global computer internetworking, offer vast amounts of stored and dynamic information to interested users. Indeed, some estimate that hundreds of thousands of news articles stream through the global internetwork each day, and that the total number of files transferred through the global internetwork (hereinafter "network") is in the millions. As computer technology evolves, and as more users participate in this form of communication, the amount of information available on the network will be staggering.

Although databases are relatively static and can be searched using conventional network search engines, current information filtering schemes are ill-suited to thoroughly search the massive, dynamic stream of new information passing through the network each day.

Presently, the information is organized, if at all, to the extent that only skilled, persistent, and lucky, researchers can ferret out meaningful information. Nevertheless, significant amounts of information may go unnoticed. For example, because most existing information filtering schemes focus on locating textual articles, information in other forms—visual, audio, multimedia, and patterned data—may be overlooked completely. From the perspective of some users, a few items of meaningful "information" can be obscured by the volume of irrelevant data streaming through the network. Often, the information obtained is inconsistent over a community of like-minded researchers because of the nearly-infinite individual differences in conceptualization and vocabulary within the community. These inconsistencies exist with both the content of the information and the manner in which a search for the content is performed. Furthermore, the credibility of the author, the accuracy, and quality of a given article's content, and thus the article's "usefulness," often are questionable.

The problem of information overload can be more acute for persons involved in multidisciplinary endeavors, e.g., medicine, law, and marketing, who are charged with monitoring developments in diverse professional domains. There are many reasons why users want to communicate with each other about specific things as they find networked resources. However, drawing attention to articles of common interest to a community of researchers, or workgroup, often requires a separate intervention, such as a telephone call, electronic mail, and the like.

Often, membership in a workgroup or community is sharply defined, and workers in one physical community may be unaware of interesting developments in other workgroups or communities, whether or not the communities are similar. This isolation may be at the expense of serendipitous discoveries that can arise from parallel developments in unrelated or marginally-related fields.

Adding to the complexity of the information filtering problem is that an individual user's interests may shift over time, as may those of a community, and many existing information filtering schemes are unable to accept shifts in the individual's interest, the community's interest, or both. Furthermore, information flow usually is unidirectional to the user, and little characterization of secondary user, or group, interests, e.g., the consumer preferences of users primarily interested in molecular biology or oenology, is derived and used to provide targeted marketing to those users/consumers, and to follow changing demographic trends.

Typically, identifying new information is effected by monitoring all articles in a data stream, selecting those articles having a specific topic, and searching through all of the selected articles, perhaps thousands, each day. One example is where users interact with a web browser to retrieve documents from various document servers on the network. Given the increasing impracticality of this brute-force approach, the heterogenous nature of "information" on the global internetwork, and the growing complexity of social interactions that are evolving concurrently with networking technology, there have been several attempts to address some of the foregoing problems by using adaptive information filtering systems.

In one approach, the information filtering is geared toward content-based filtering. Here, the information filtering system examines the user's patterns of keywords, and semantic and contextual information, to map information to a user's interests. This approach does not provide a mechanism for collaborative activities within a group.

Another approach uses intelligent software agents to learn a user's behavior, i.e., "watching over the shoulder," regarding certain types of textual information, for example, electronic mail messages. In this scheme, the agents offer to take action, e.g., delete the message, forward it, etc., on the basis of the user's prior responses to the content of that certain information. Also, this scheme provides a minor degree of inter-agent collaboration by allowing one agent to draw upon the experience of other agents, typically for the purpose of initialization. However, each agent is constrained to develop its expertise in a particular domain within the limited range of the type of information. Also, the passive feedback nature of the "over-the-shoulder" approach can place an unacceptable burden on the system's learner, reducing information throughput and decreasing the efficiency and usefulness of the overall system. Also, systematic errors can be introduced into the passive feedback error, and the actual response of the user may be misinterpreted.

Another approach uses content-based filtering to select documents for a user to read, and supports inter-user collaboration by permitting the users in a defined group to annotate the selected documents. Annotations tend to take as many forms as there are users, placing the emphasis on characterizing, maintaining, and manipulating a group of diverse annotations, or "meta-documents," from different users in conjunction with the original document. Collaboration is achieved by enabling the filters of other users to access the annotations. While this approach is useful to the extent that other users can receive a deeper understanding of the comments and criticism provided by a particular user, the costs include the additional computer effort required to implement such collaboration over large, diverse groups and, more importantly, the extra time required for each user to review the comments and criticism of the annotations of the others. Also, annotation sharing and filtering are hampered by the variety in vocabulary and conceptualization among users.

Yet another approach employs collaborative filters to help users make choices based on the opinions of other users. The method employs rating servers to gather and disseminate ratings. A rating server predicts a score, or rating, based on the heuristic that people who agreed in the past will probably agree again. This system is typically limited to the homogenous stream of text-based news articles, does little content-filtering, and can not accommodate heterogenous information.

Other projects have explored individual features such as market-trading optimization techniques for prioritizing incoming messages; rule-based agents for recognizing user's usage patterns and suggesting new filtering patterns to the user; and personal-adaptive recommendation systems using exit-questions for rating documents and creating shared recommendations; and the like. In each case, the collaborative and content-based aspects of information filtering are not integrated, and the filters are not equipped to deal with heterogenous data streams.

Many information filtering systems use a weighted average technique for user information feedback that, for example, extracts all of the ratings for an article and takes a simple weighted average over all of the ratings to predict whether an article is relevant to a particular user. Simple weighted averaging, however, tends to destroy the information content contained in the ratings, unless a relatively sophisticated approach is used for the functions generating the simple weighted averages. Little impact is given to factors such as credibility, personal preferences, and the like, which factors tend to be irreversibly blurred during the averaging process. Simple weighted averages, then, can be lacking when one desires to develop information filters that are well-fitted to a particular community and the specific interests of a user unless innovative methods are employed to preserve at least some of the relevant information.

What is needed then is an apparatus and method for information filtering in a computer system receiving a data stream from a computer network in which entities of information relevant to the user, or "informons," are extracted from the data stream using content-based and collaborative filtering. Such a system would employ an adaptive content filter and an adaptive collaborative filter which are integrated to the extent that an individual user can be a unique member client of multiple communities with each community including multiple member clients sharing similar interests.

The system also would implement adaptive credibility filtering, providing member clients with a measure of informon credibility, as judged by other member clients in the community. The system also may implement recommendation filtering and consultation filtering. Furthermore, the system would be preferred to be self-optimizing in that the adaptive filters used in the system would seek optimal values for the function intended by the filter, e.g., collaboration, content analysis, credibility, etc.

3. Citation of Relevant Publications

In the context of the foregoing description of the relevant art, and of the description of the present invention which follows, the following publications can be considered to be relevant:

Susan Dumais, et al. Using Latent Semantic Analysis to Improve Access to Textual Information. In *Proceedings of CHI-88 Conference on Human Factors in Computing Systems*. (1988, New York: ACM)

David Evans et al. A Summary of the CLARIT Project. Technical Report, Laboratory for Computational Linguistics, Carnegie-Mellon University, September 1991.

G. Fischer and C. Stevens. Information Access in Complex, Poorly Structured Information Spaces. In *Proceedings of CHI-91 Conference on Human Factors in Computing Systems*. (1991: ACM)

D. Goldberg, et al. Using Collaborative Filtering to Weave an Information Tapestry. *Communications of the ACM*, 35, 12 (1992), pp. 61–70.

Simon Haykin. *Adaptive Filter Theory*. Prentice-Hall, Englewood Cliffs, N.J. (1986), pp. 100–380.

Simon Haykin. *Neural Networks: A Comprehensive Foundation*. Macmillan College Publishing Co., New York (1994), pp. 18–589.

Yezdi Lashkari, et al. Collaborative Interface Agents. In *Conference of the American Association for Artificial Intelligence*. Seattle, Wash., August 1994.

Paul Resnick, et al. GroupLens: An Open Architecture for Collaborative Filtering of Netnews. In *Proceeding of ACM 1994 Conference on Computer Supported Cooperative Work*. (1994: ACM), pp. 175–186.

Anil Rewari, et al. AI Research and Applications In Digital's Service Organization. *AI Magazine*: 68–69 (1992).

J. Rissanen. Modelling by Shortest Data Description, *Automatica*, 14:465–471 (1978).

Gerard Salton. Developments in Automatic Text Retrieval. *Science*, 253:974–980, August 1991.

C. E. Shannon. A Mathematical Theory of Communication. *Bell Sys. Tech. Journal*, 27:379–423 (1948).

Beerud Sheth. A Learning Approach to Personalized Information Filtering, Master's Thesis, Massachusetts Institute of Technology, February, 1994.

F. Mosteller, et al. *Applied Bayesian and Classical Inference: The Case of the Federalist Papers. Springer-Verlag*, New York (1984), pp. 65–66.

T. W. Yan et al. Index Structures for Selective Dissemination of Information. Technical Report STAN-CS-92-1454, Stanford University (1992).

Yiming Yang. An Example-Based Mapping Method for Text Categorization and Retrieval. *ACM Transactions on Information Systems*. Vol. 12, No. 3, July 1994, pp. 252–277.

SUMMARY OF THE INVENTION

The invention herein provides a method for information filtering in a computer system receiving a data stream from a computer network. Embedded in the data stream are raw informons, with at least one of the raw informons being of interest to the user. The user is a member client of a community. The method includes the steps of providing a dynamic informon characterization having a plurality of profiles encoded therein, the plurality of profiles including an adaptive content profile and an adaptive collaboration profile; adaptively filtering the raw informons responsive to the dynamic informon characterization, producing a proposed informon thereby; presenting the proposed informon to the user; receiving a feedback profile from the user, responsive to the proposed informon; adapting at least one of the adaptive content profile and the adaptive collaboration profile responsive to the feedback profile; and updating the dynamic informon characterization responsive to the previous step of adapting. The method is an interactive, distributed, adaptive filtering method which includes community filtering and client filtering. This filtering respectively produces a community profile and a member client profile. Each of the community filtering and client filtering can be responsive to the adaptive content profile and the adaptive collaboration profile. Furthermore, the dynamic informon characterization is adapted in response to the community profile, the member client profile, or both. The dynamic informon characterization includes a prefiltering profile, an adaptive broker filtering profile, and a member client profile. Also, adaptively filtering includes the steps of prefiltering the data stream according to the prefiltering profile, thereby extracting a plurality of raw informons from the data stream, the prefiltering profile being responsive to the adaptive content profile; filtering the raw informons according to the adaptive broker profile, the adaptive broker profile including the adaptive collaborative profile and the adaptive content profile; and client user filtering the raw informons according to an adaptive member client profile, thereby extracting the proposed informon.

Another embodiment of the method provides the steps of partitioning each user into a plurality of member clients, each member client having a unique member client profile, each profile having a plurality of client attributes; grouping member clients to form a plurality of communities, each community including selected clients of the plurality of member clients, selected client attributes of the selected clients being comparable to others of the selected clients thereby providing each community with a community profile having common client attributes; predicting at least one community profile for each community using first prediction criteria; predicting at least one member client profile for the client in a community using second prediction criteria; extracting the raw informons from the data stream, each of the raw informons having an informon content; selecting proposed informons from the raw informons, the proposed informons being correlated with at least one of the common client attributes and the member client attributes; providing the proposed informons to the user; receiving user feedback in response to the proposed informons; and updating at least one of the first and second prediction criteria responsive to the user feedback. The method also can include the step of prefiltering the data stream using the predicted community profile, with the predicted community profile identifying the raw informons in the data stream.

In addition, the step of selecting can include filtering the raw informons using an adaptive content filter responsive to the informon content; filtering the raw informons using an adaptive collaboration filter responsive to the common client attributes for the respective community; and filtering the raw informons using an adaptive member client filter responsive to the unique member client profile.

The method also can include one or more of the steps of credibility filtering, recommendation filtering, and consultation filtering the raw informon responsive to the feedback profile and providing a respective adaptive recommendation profile and adaptive consultation profile. The step of prefiltering includes the step of creating a plurality of mode-invariant concept components for each of the raw informons; and the step of filtering the raw informons includes the steps of (1) concept-based indexing of each of the mode-invariant concepts into a collection of indexed informons; and (2) creating the community profile from the collection of indexed informons.

One embodiment of the present invention provides an information filtering apparatus in a computer system receiving a data stream from a computer network, the data stream having raw informons embedded therein. The apparatus includes an extraction means for identifying and extracting the raw informons from the data stream, each of the informons having informon content, at least one of the raw informons being of interest to a user having a user profile, the user being a member of a network community having a community profile, at least a portion of each of the user profile and the community profile creating an adaptive collaboration profile, the extracting means being coupled to the computer network. The apparatus also includes filter means for adaptively filtering the raw informons responsive to the adaptive collaboration profile and an adaptive content profile and producing a proposed informon thereby, the informon content being filtered according to the adaptive content profile, the filter means being coupled with the extraction means. Additionally, the apparatus includes communication means for conveying the proposed informon to the user and receiving a feedback response therefrom, with the feedback response corresponding to a feedback profile, the communication means being coupled with the filter means.

Profile adaptation is accomplished by a first adaptation means for adapting at least one of the collaboration profile and the content profile responsive to the feedback profile, the first adaptation means being coupled to the filter means. The first adaptation means includes a prediction means for predicting a response of the user to a proposed informon, the prediction means receiving a plurality of temporally-spaced feedback profiles and predicting at least a portion of a future one of the adaptive collaboration profile and the adaptive content profile in response thereto. Also included are computer storage means for storing the adaptive collaborative profile and the adaptive content profile, the storage means being coupled to the filter means.

The apparatus also includes second adaptation means for adapting at least one of the user profile responsive to at least one of the community profile and the adaptive content profile, and the community profile responsive to at least one of the user profile and the content profile, and the content profile responsive to at least one of the user profile and the community profile. It is preferred that the prediction means is a self-optimizing prediction means using a preselected learning technique, and that learning technique includes at least one of a top-key-word-selection learning technique, a nearest-neighbor learning technique, a term-weighting learning technique, a probabilistic learning technique, and a neural network learning technique.

DETAILED DESCRIPTION OF THE EMBODIMENTS

Figure 1:
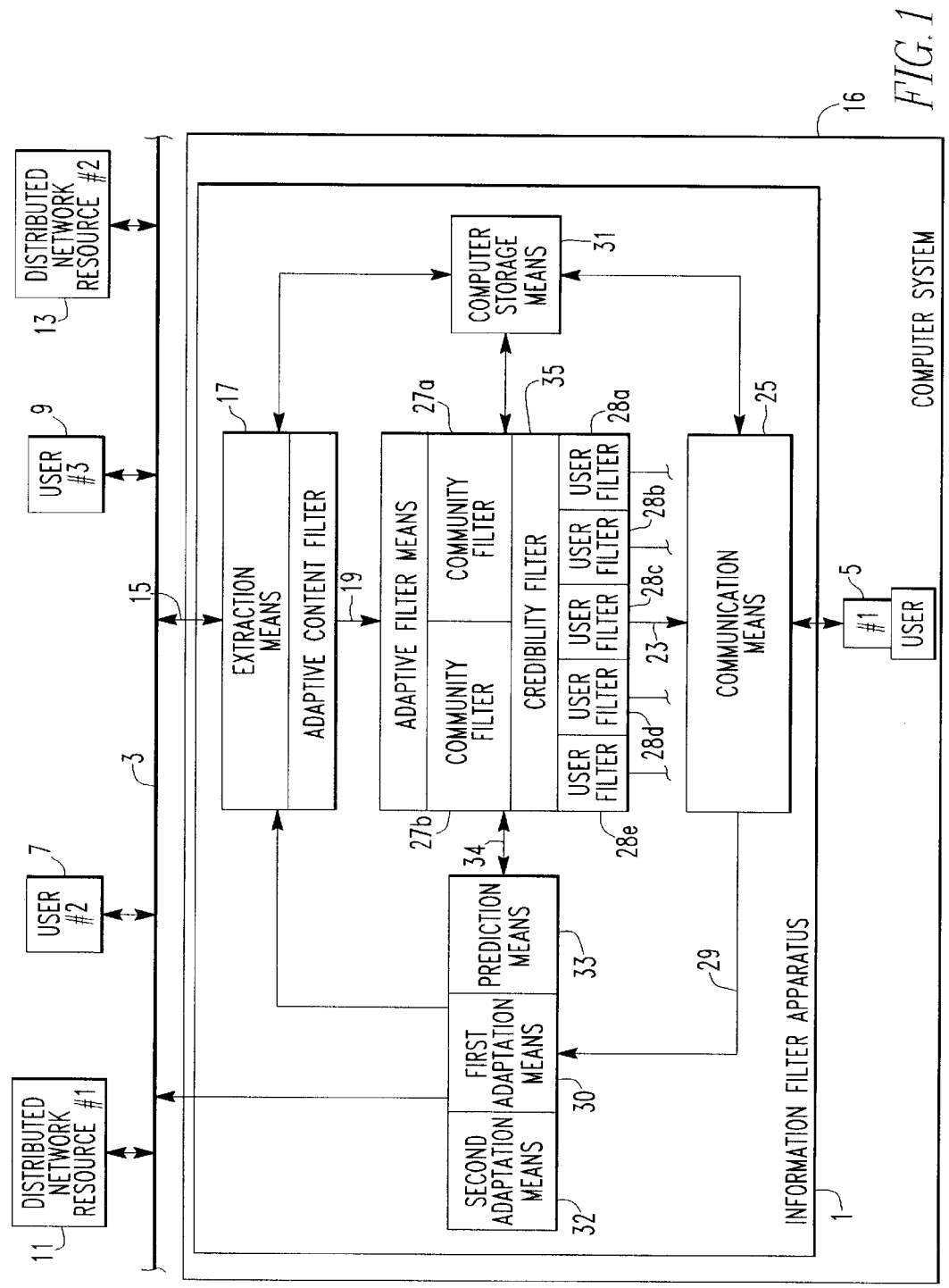
FIG. 1 is an diagrammatic representation of an embodiment of an information filtering apparatus according to the present invention.

The invention herein provides an apparatus and method for information filtering in a computer system receiving a data stream from a computer network, in which entities of information relevant to the user, or "informons," are extracted from the data stream using content-based and collaborative filtering. The invention is both interactive and distributed in structure and method. It is interactive in that communication is substantially bi-directional at each level of the invention. It is distributed in that all or part of the information filter can include a purely hierarchical (up-and-down/parent-child) structure or method, a purely parallel (peer-to-peer) structure or method, or a combination of hierachical and parallel structures and method. The invention also provides a computer program product that implements selected embodiments of the apparatus and method.

As used herein, the term "informon" comprehends an information entity of potential or actual interest to a particular user. In general, informons can be heterogenous in nature and can be all or part of a textual, a visual, or an audio entity. Also, informons can be composed of a combination of the aforementioned entities, thereby being a multimedia entity. Furthermore, an informon can be an entity of patterned data, such as a data file containing a digital representation of signals and can be a combination of any of the previously-mentioned entities. Although some of the data in a data stream, including informons, may be included in an informon, not all data is relevant to a user, and is not within the definition of an informon. By analogy, an informon may be considered to be a "signal," and the total data stream may be considered to be "signal+noise." Therefore, an information filtering apparatus is analogous to other types of signal filters in that it is designed to separate the "signal" from the "noise."

Also as used herein, the term "user" is an individual in communication with the network. Because an individual user can be interested in multiple categories of information, the user can be considered to be multiple clients each having a unique profile, or set of attributes. Each member client profile, then, is representative of a particular group of user preferences. Collectively, the member client profiles associated with each user is the user profile. The present invention can apply the learned knowledge of one of a user's member clients to others of the user's member clients, so that the importance of the learned knowledge, e.g., the user's preference for a particular author in one interest area as represented by the member client, can increase the importance of that particular factor, A's authorship, for others of the user's member clients. Each of the clients of one user can be associated with the individual clients of other users insofar as the profiles of the respective clients have similar attributes. A "community" is a group of clients, called member clients, that have similar member client profiles, i.e., that share a subset of attributes or interests. In general, the subset of shared attributes forms the community profile for a given community and is representative of the community norms, or common client attributes.

The "relevance" of a particular informon broadly describes how well it satisfies the user's information need. The more relevant an informon is to a user, the higher the "signal" content. The less relevant the informon, the higher the "noise" content. Clearly, the notion of what is relevant to a particular user can vary over time and with context, and the user can find the relevance of a particular informon limited to only a few of the user's potentially vast interest areas. Because a user's interests typically change slowly, relative to the data stream, it is preferred to use adaptive procedures to track the user's current interests and follow them over time. Provision, too, is preferred to be made for sudden changes in interest, e.g., taking up antiquarian sword collecting and discontinuing stamp collecting, so that the method and apparatus track the evolution of "relevance" to a user and the communities of which the user is a member. In general, information filtering is the process of selecting the information that a users wishes to see, i.e., informons, from a large amount of data. Content-based filtering is a process of filtering by extracting features from the informon, e.g., the text of a document, to determine the informon's relevance. Collaborative filtering, on the other hand, is the process of filtering informons, e.g., documents, by determining what informons other users with similar interests or needs found to be relevant.

The invention employs adaptive content-based filters and adaptive collaborative filters, which respectively include, and respond to, an adaptive content profile and an adaptive collaboration profile. As used herein, the term "content-based filter" means a filter in which content data, such as key words, is used in performing the filtering process. In a collaborative filter, other user data is used in performing the filtering process. A collaborative filter is also sometimes referred to as a "content" filter since it ultimately performs the task of finding an object or document having content relevant to the content desired by a user. If there are some instances herein where the term "content filter" is used as distinguished from a collaborative filter, it is intended that the term "content filter" mean "content-based filter." The adaptive filters each are preferred to include at least a portion of a community filter for each community serviced by the apparatus, and a portion of a member client filter for each member client of the serviced communities. For this reason, the adaptive filtering is distributed in that each of the community filters perform adaptive collaborative filtering and adaptive content filtering, even if on different levels, and even if many filters exist on a given level. The integrated filtering permits an individual user to be a unique member client of multiple communities, with each community including multiple member clients sharing similar interests. The adaptive features permit the interests of member clients and entire communities to change gradually over time. Also a member client has the ability to indicate a sudden change in preference, e.g., the member client remains a collector but is no longer interested in coin collecting.

The invention also implements adaptive credibility filtering, providing member clients with a measure of informon credibility, as judged by other member clients in the community. For example, a new member client in a first community, having no credibility, can inject an informon into the data flow, thereby providing other member clients in other communities with the proposed informon, based on the respective community profile and member client profiles. If the other member clients believe the content of the informon to be credible, the adaptive credibility profile will reflect a growing credibility. Conversely, feedback profiles from informon recipients that indicate a lack of credibility cause the adaptive credibility profile, for the informon author, to reflect untrustworthiness. However, the growth and declination of credibility are not "purely democratic," in the sense that one's credibility is susceptible to the bias of others' perceptions, so the growth or declination of one's credibility is generally proportional to how the credibility of the new member client is viewed by other member clients.

Member clients can put their respective reputations "on the line," and engage in spirited discussions which can be refereed by other interested member clients. The credibility profile further can be partitioned to permit separate credibility sub-profiles for the credibility of the content of the informon, the author, the author's community, the reviewers, and the like, and can be fed back to discussion participants, reviewers, and observers to monitor the responses of others to the debate. The adaptive credibility profiles for those member clients with top credibility ratings in their communities may be used to establish those member clients as "experts" in their respective communities.

With this functionality, additional features can be implemented, including, for example, "instant polling" on a matter of political or consumer interest. In conjunction with both content and collaborative filtering, credibility filtering, and the resulting adaptive credibility profiles, also may be used to produce other features, such as on-line consultation and recommendation services. Although the "experts" in the communities most closely related to the topic can be afforded special status as such, member clients from other communities also can participate in the consultation or recommendation process.

In one embodiment of the consultation service, credibility filtering can be augmented to include consultation filtering. With this feature, a member client can transmit an informon to the network with a request for guidance on an issue, for example, caring for a sick tropical fish. Other member clients can respond to the requester with informons related to the topic, e.g., suggestions for water temperature and antibiotics. The informons of the responders can include their respective credibility profiles, community membership, and professional or avocational affiliations. The requester can provide feedback to each of the responders, including a rating of the credibility of the responder on the particular topic. Additionally, the responders can accrue quality points, value tokens, or "info bucks," as apportioned by the requester, in return for useful guidance.

Similarly, one embodiment of an on-line recommendation service uses recommendation filtering and adaptive recommendation profiles to give member clients recommendations on matters as diverse as local auto mechanics and world-class medieval armor refurbishers. In this embodiment, the requester can transmit the informon to the network bearing the request for recommendation. Other member clients can respond to the requester with informons having specific recommendations or disrecommendations, advice, etc. As with the consultation service, the informons of the responders can be augmented to include their respective credibility profiles, community membership, and professional or avocational affiliations. A rating of each recommendation provided by a responder, relative to other responders' recommendations, also can be supplied. The requester can provide feedback to each of the responders, including a rating of the credibility of the responder on the particular topic, or the quality of the recommendation. As before, the responders can accrue quality points, value tokens, or "info bucks," as apportioned by the requester, in return for the useful recommendation.

Furthermore, certain embodiments of the invention are preferred to be self-optimizing in that some or all of the adaptive filters used in the system dynamically seek optimal values for the function intended by the filter, e.g., content analysis, collaboration, credibility, reliability, etc.

The invention herein is capable of identifying the preferences of individual member clients and communities, providing direct and inferential consumer preference information, and tracking shifts in the preferences whether the shifts be gradual or sudden. The consumer preference information can be used to target particular consumer preference groups, or cohorts, and provide members of the cohort with targeted informons relevant to their consumer preferences. This information also may be used to follow demographical shifts so that activities relying on accurate demographical data, such as retail marketing, can use the consumer preference information to anticipate evolving consumer needs in a timely manner.

To provide a basis for adaptation, it is preferred that each raw informon be processed into a standardized vector, which may be on the order of 20,000 to 100,000 tokens long. The learning and optimization methods that ultimately are chosen are preferred to be substantially robust to the problems which can be presented by such high-dimensional input spaces. Dimensionality reduction using methods such as the singular value decomposition (SVD), or auto-encoding neural networks attempt to reduce the size of the space while initially retaining the information contained in the original representation. However, the SVD can lose information during the transformation and may give inferior results. Two adaptation/learning methods that are presently preferred include the TF-IDF technique and the MDL technique.

TF-IDF is a weighting scheme that gives emphasis to the weighting parameters for more important terms in an informon. TF represents "Term frequency," or the number of times a particular term occurs in a given informon. This is one of the factor used in developing the weighting. IDF represents "inverse-document-frequency," which is a measure of how often a particular term has a cross-appearance in a group of informons. Typically, common words have a low IDF, and unique terms will have a high IDF.

The TF-IDF weighting technique employs two empirical observations regarding text. First, the more times a token t appears in a document d (called the term frequency, or $tf_{t,d}$), the more likely it is that t is relevant to the topic of d. Second, the more times t occurs throughout all documents (called the document frequency or $df_t$), the more poorly t discriminates between documents. For a given document, these two terms can be combined into weights by multiplying the tf by the inverse of the df (i.e., idf) for each token. Often, the logarithm of tf or idf is taken in order to de-emphasize the increases in weight for larger values.

One weight used for token t in document d is:

$$w(t,d) = tf_{t,d} \log(|N|/df_t)$$

where N is the entire set of documents. The way in which TF-IDF vectors are compared also takes advantage of the domain. Because documents usually contain only a small fraction of the total vocabulary, the significance of a word appearing is much greater than of it not appearing. To emphasize the stronger information content in a word appearing, the cosine of the angle between vectors is used to measure the similarity between them. The effect of this cosine similarity metric can be better understood by the following example. Suppose two documents each contain a single word, but the words are different. The similarity of the documents then would be zero, because the cosine of the angle between two perpendicular vectors is zero. A more unbiased learning technique that did not take advantage of this domain feature usually would group the two documents as being very similar because all but two of the elements in the lengthy vectors agreed (i.e. they were zero).

Using TF-IDF and the cosine similarity metric, there are many ways to then classify documents into categories, as recognized by a skilled artisan. For example, any of the family of nearest-neighbor techniques could be used. In the present invention, the informons in each category can be converted into TF-IDF vectors, normalized to unit length, and then averaged to get a prototype vector for the category.

The advantages to taking this approach include an increased speed of computation and a more compact representation. To classify a new document, the document can be compared with each prototype vector and given a predicted rating based on the cosine similarities to each category rating. In this step, the results can be converted from a categorization procedure to a continuous value, using a linear regression.

Probabilistic techniques consider the probability that a particular term, or concept, that occurs in an informon, or that the informon satisfies the user's information need. Minimum description length, or MDL, is a probabilistic technique that attempts to minimize the description length of an entire data set. The MDL principle can be applied to measure the overall "quality" and "cost" of a predicted data set, or model, and to optimize both quality and cost, striking a balance between the quality of the prediction and the complexity cost for achieving that quality.

The Minimum Description Length (MDL) Principle provides an information-theoretic framework for balancing the tradeoff between model complexity and training error. In the present invention's domain, this tradeoff involves how to weight each token's importance and how to decide which tokens should be left out of the model for not having enough discriminatory power. The MDL principle is based Bayes' Rule:

$$p(H|D) = \frac{p(D|H)p(H)}{p(D)}$$

Generally, it is desirable to find hypothesis H that maximizes p(H|D), i.e. the probability of H given the observed data D. By Bayes' Rule, this is equivalent to maximizing p(D|H)p(H)/p(D), because p(D) is essentially independent of H, p(D|H)p(H) can be maximized; or, equivalently, $$-\log(p(D|H)) - \log(p(H))$$

can be maximized from information theory principles, $-\log_2(p(X))$ is equal to the size in bits of encoding event X in an optimal binary code. Therefore, the MDL interpretation of the above expression is that, to find the most probable hypothesis given the data, the hypothesis which minimizes the total encoding length should be found. This encoding length is equal to the number of bits required to encode the hypothesis, plus the bits required to encode the data given the hypothesis. Given a document D with token vector $T_d$ (containing $l_d$ non-zero unique tokens in the informon) and training data $D_{train}$, the most probable category $c_i$ for d is that which minimizes the bits needed to encode $T_d$ plus $C_i$:

$$\arg\max_{c_i} [p(c_i|T_d,l_d,D_{train})] =$$

$$\arg\min_{c_i} [-\log(p(T_d|c_i,l_d,D_{train})) - \log(p(c_i|l_d,D_{train}))]$$

The data independence assumption is that the probability of the data in an informon or document, given its length and category, is the product of the individual token probabilities, is $$p(T_d|c_i,l_d,D_{train}) = \Pi p(t_{i,d}|c_i,l_d,D_{train})$$

where $t_{i,d}$ is a binary value indicating whether or not the token i occurred at least once in document d.

Generally, one way to derive a probability estimate for $t_{i,d}$ while avoiding a computationally expensive optimization step for the model parameters is to compute the following additional statistics from the training data, and use them as the parameters in the model:

$$t_i = \sum_{j \in N} t_{i,j}$$

Where $t_i$ is the number of documents containing token i, and $r_{i,l}$

Where $r_{i,l}$ is a correlation estimate [0–1] between $t_{i,d}$ and $l_d$.

Each statistic can be computed for each concept, and for the total across all concepts. The objective is to establish a general "background" distribution for each token, and a category-specific distribution. If the token distribution is a simple binomial, independent of document length $$p(t_{i,d}=0|[c_k])=1-t[,c_k]/|N_{[c_k]}|$$

However, if the token probability is dependent on document length, the following approximation is valid.

$$p(t_{i,d}=0|l_d[,c_k]) = \left(1 - t[,c_k]/\sum_{j \in N[c_k]} l_j\right)^{l_d}$$

The above two distributions can then be combined in a mixture model by weighting them with $t_{i,d}$ to provide:

$$p(t_{i,d}=0|l_d[,c_k]) = (1 - t_{i[c_k]}/N_{[c_k]})^{1-r_{i,l}} \times \left(1 - t_{i[c_k]}/\sum_{j \in N_{[c_k]}} l_j\right)^{l_d \times t_{i,l}}$$

By hypothesizing that each token either truly has a specialized distribution for a category, or that the token is unrelated to that category and just exhibits random background fluctuations, the MDL criteria for making the decision between these hypotheses is to choose the category-specific hypothesis if the total bits saved in using this hypothesis, or total bits=

$$\text{Total bits} = \sum_{d \in Nc_k} -\log(p(t_{i,d}|l_d)) - [-\log(p(t_{i,d}|l_d,c_k))]$$

is greater than the complexity cost of including the extra category-specific parameters.

An additional pragmatic advantage to this probabilistic model choice is that when the logs are taken of the probabilities to get costs in bits, the probability calculation for each article's words becomes a simple, linear one that can be computed in $O(l_d)$, rather than the longer $O(|dictionary|)$. This is due to the ability to precompute the sum of the bits required to encode no words occurring. From this sum the bits required for an actual document can quickly be computed.

One method for learning at least one of the TF-IDF and the MDL approaches can employ the following steps:

1. Divide the articles into training and unseen test sets.
2. Parse the training articles, throwing out tokens occurring less than a preselected threshold.
3. For TF-IDF, also throw out the F most frequent tokens over the entire training set.
4. Compute $t_i$ and $r_{i,l}$ for each token.
5. For TF-IDF, compute the term weights, normalize the weight vector for each informon A, and find the average of the vectors for each rating category M.
6. For MDL, decide for each token t and category c whether to use p(t/l,c)=p(t/l), or use a community dependent model for when t occurs in c. Then pre-compute the encoding lengths for no tokens occurring for informons in each community.

7. For TF-IDF, compute the similarity of each training informon to each rating category prototype using, for example, the cosine similarity metric.
8. For MDL, compute the similarity of each training informon to each rating category by taking the inverse of the number of bits needed to encode $T_d$ under the community's probabilistic model.
9. Using the similarity measurements computed in steps 7 or 8 on the training data, compute a linear regression from rating community similarities to continuous rating predictions.
10. Apply the model obtained in steps 7–9 similarly to test informons.

FIG. 1 illustrates one embodiment of an information filtering apparatus 1 according to the invention herein. In general, a data stream is conveyed through network 3, which can be a global internetwork. A skilled artisan would recognize that apparatus 1 can be used with other types of networks, including, for example, an enterprise-wide network, or "intranet." Using network 3, User #1 (5) can communicate with other users, for example, User #2 (7) and User #3 (9), and also with distributed network resources such as resource #1 (11) and resource #2 (13).

Apparatus 1 is preferred to be part of computer system 16, although User #1 (5) is not required to be the sole user of computer system 16. In one present embodiment, it is preferred that computer system 16 having information filter apparatus 1 therein filters information for a plurality of users. One application for apparatus 1, for example, could be that user 5 and similar users may be subscribers to a commercial information filtering service, which can be provided by the owner of computer system 16.

Extraction means 17 can be coupled with, and receives data stream 15 from, network 3. Extraction means 17 can identify and extract raw informons 19 from data stream 15. Each of the raw informons 19 has an information content. Extraction means 17 uses an adaptive content filter, and at least part of the adaptive content profile, to analyze the data stream for the presence of raw informons. Raw informons are those data entities whose content identifies them as being "in the ballpark," or of potential interest to a community coupled to apparatus 1. Extraction means 17 can remove duplicate informons, even if the informons arrive from different sources, so that user resources are not wasted by handling and viewing repetitive and cumulative information. Extraction means 17 also can use at least part of a community profile and a user profile for User #1 (5) to determine whether the informon content is relevant to the community of which User #1 is a part.

Filter means 21 adaptively filters raw informons 19 and produces proposed informons 23 which are conveyed to User #1 (5) by communication means 25. A proposed informon is a selected raw informon that, based upon the respective member client and community profiles, is predicted to be of particular interest to a member client of User 5. Filter means 21 can include a plurality of community filters 27a,b and a plurality of member client filters 28a–e, each respectively having community and member client profiles. When raw informons 19 are filtered by filter means 21, those informons that are predicted to be suitable for a particular member client of a particular community, e.g., User #1 (5), responsive to the respective community and member client profiles, are conveyed thereto. Where such is desired, filter means 21 also can include a credibility filter which enables means 21 to perform credibility filtering of raw informons 19 according to a credibility profile.

It is preferred that the adaptive filtering performed within filter means 21 by the plurality of filters 27a,b, 28a–e, and 35, use a self-optimizing adaptive filtering so that each of the parameters processed by filters 27a,b, 28a–e, and 35, is driven continually to respective values corresponding to a minimal error for each individual parameter. Self-optimization encourages a dynamic, marketplace-like operation of the system, in that those entities having the most desirable value, e.g., highest credibility, lowest predicted error, etc., are favored to prevail.

Self-optimization can be effected according to respective preselected self-optimizing adaptation technique including, for example, one or more of a top-key-word-selection adaptation technique, a nearest-neighbor adaptation technique, a term-weighting adaptation technique, a probabilistic adaptation technique, and a neural network learning technique. In one present embodiment of the invention, the term-weighting adaptation technique is preferred to be a TF-IDF technique and the probabilistic adaptation technique is preferred to be a MDL technique.

When user 5 receives proposed informon 23 from apparatus 1, user 5 is provided with multiple feedback queries along with the proposed informon. By answering, user 5 creates a feedback profile that corresponds to feedback response 29. User feedback response 29 can be active feedback, passive feedback, or a combination. Active feedback can include the user's numerical rating for an informon, hints, and indices. Hints can include like or dislike of an author, and informon source and timeliness. Indices can include credibility, agreement with content or author, humor, or value. Feedback response 29 provides an actual response to proposed informon 23, which is a measure of the relevance of the proposed informon to the information need of user 5. Such relevance feedback attempts to improve the performance for a particular profile by modifying the profiles, based on feedback response 29.

A predicted response anticipated by adaptive filtering means 21 can be compared to the actual feedback response 29 of user 5 by first adaptation means 30, which derives a prediction error. First adaptation means 30 also can include prediction means 33, which collects a number of temporally-spaced feedback responses, to update the adaptive collaboration profile, the adaptive content profile, or both, with an adapted future prediction 34, in order to minimize subsequent prediction errors by the respective adaptive collaboration filter and adaptive content filter.

In one embodiment of the invention herein, it is preferred that prediction means 33 be a self-optimizing prediction means using a preselected learning technique. Such techniques can include, for example, one or more of a top-key-word-selection learning technique, a nearest-neighbor learning technique, a term-weighting learning technique, and a probabilistic learning technique. First adaptation means 30 also can include a neural network therein and employ a neural network learning technique for adaptation and prediction. In one present embodiment of the invention, the term-weighting learning technique is preferred to be a TF-IDF technique and the probabilistic learning technique is preferred to be a MDL learning technique.

First adaptation means 30 further can include second adaptation means 32 for adapting at least one of the adaptive collaboration profiles, the adaptive content profiles, the community profile, and the user profile, responsive to at least one of the other profiles. In this manner, trends attributable to individual member clients, individual users, and individual communities in one domain of system 16 can be recognized by, and influence, similar entities in other domains (molding of agent "minds"), contained within system 16 to the extent that the respective entities share common attributes.

Apparatus 1 also can include a computer storage means 31 for storing the profiles, including the adaptive content profile and the adaptive collaboration profile. Additional trend-tracking information can be stored for later retrieval in storage means 31, or may be conveyed to network 3 for remote analysis, for example, by User #2 (7).

Figure 2:
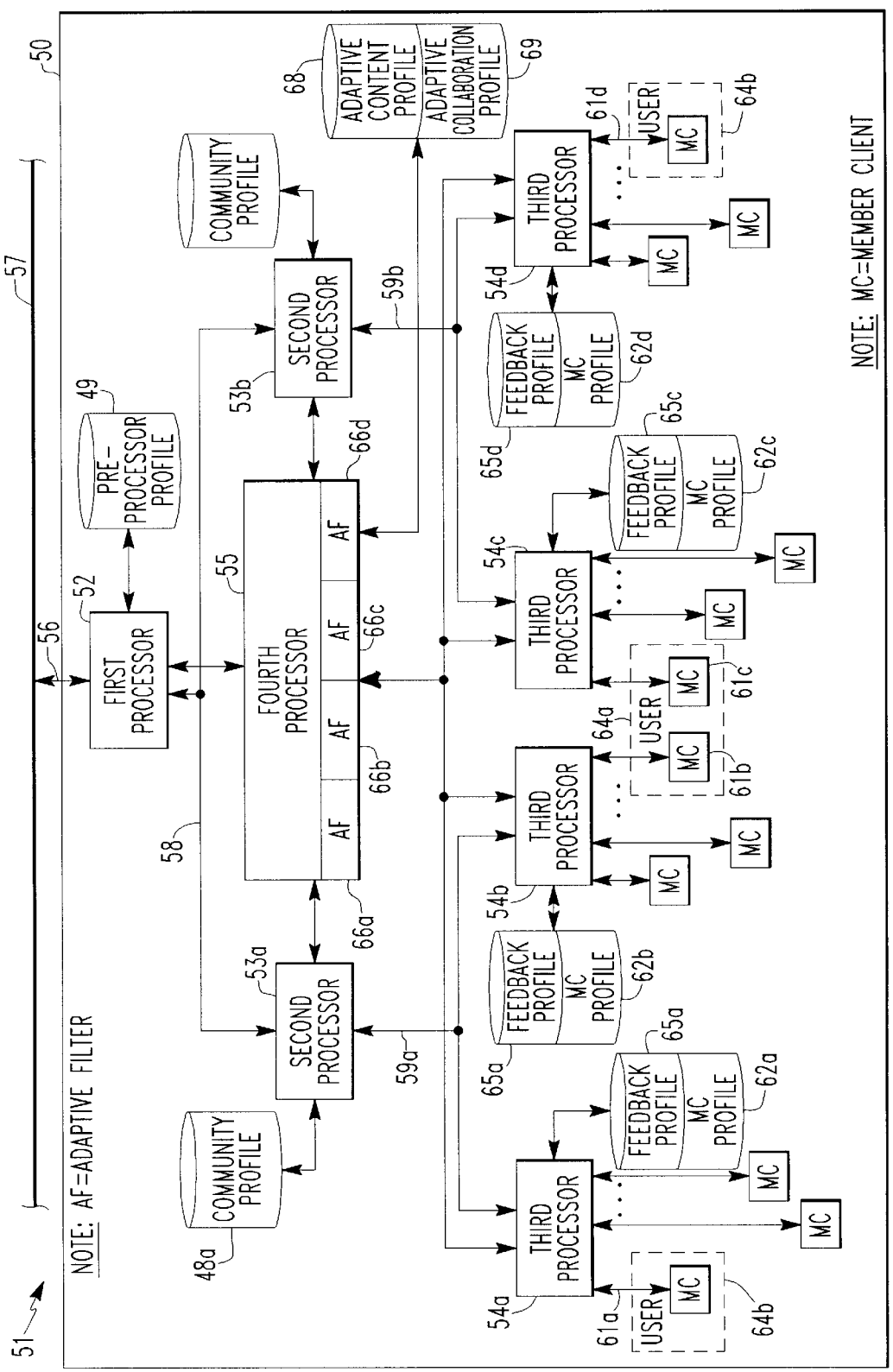
FIG. 2 is an diagrammatic representation of another embodiment of an information filtering apparatus according to the present invention.

FIG. 2 illustrates another preferred embodiment of information filtering apparatus 50, in computer system 51. Apparatus 50 can include first processor 52, second processors 53a,b, third processors 64a–d, and a fourth processor 55, to effect the desired information filtering. First processor 52 can be coupled to, and receive a data stream 56 from, network 57. First processor 52 can serve as a pre-processor by extracting raw informons 58 from data stream 56 responsive to preprocessing profile 49 and conveying informons 58 to second processors 53a,b.

Because of the inconsistencies presented by the nearly-infinite individual differences in the modes of conceptualization, expression, and vocabulary among users, even within a community of coinciding interests, similar notions can be described with vastly different terms and connotations, greatly complicating informon characterization. Mode variations can be even greater between disparate communities, discouraging interaction and knowledge-sharing among communities. Therefore, it is particularly preferred that processor 52 create a mode-invariant representation for each raw informon, thus allowing fast, accurate informon characterization and collaborative filtering. Mode-invariant representations tend to facilitate relevant informon selection and distribution within and among communities, thereby promoting knowledge-sharing, thereby benefitting the group of interlinked communities, i.e., a society, as well.

First processor 52 also can be used to prevent duplicate informons, e.g., the same information from different sources, from further penetrating, and thus consuming the resources of, the filtering process. Other processors 53,a,b, 54a–d, also may be used to perform the duplicate information elimination function, but additionally may measure the differences between the existing informon and new informons. That difference between the content of the informon the previous time the user reviewed it and the content of the informon in its present form is the "delta" of interest. Processors 53a,b, 54a–d may eliminate the informon from further processing, or direct the new, altered informon to the member client, in the event that nature or extent of the change exceeds a "delta" threshold. In general, from the notion of exceeding a preselected delta threshold, one may infer that the informon has changed to the extent that the change is interesting to the user. The nature of this change can be shared among all of a user's member clients. This delta threshold can be preselected by the user, or by the preselected learning technique. Such processing, or "delta learning" can be accomplished by second processors 53a,b, alone or in concert with third processors 54a–d. Indeed, third processor 54a–d can be the locus for delta learning, where processors 54a–d adapts a delta learning profile for each member client of the community, i.e. user, thus anticipating those changes in existing informons that the user may find "interesting."

Second processors 53a,b can filter raw informons 58 and extract proposed community informons 59a,b therefrom. Informons 59a,b are those predicted by processors 53a,b to be relevant to the respective communities, in response to community profiles 48a,b that are unique to the communities. Although only two second processors 53a,b are shown in FIG. 2, system 51 can be scaled to support many more processors, and communities. It is presently preferred that second processors 53a,b extract community informons 59a,b using a two-step process. Where processor 52 has generated mode-invariant concept representations of the raw informons, processor 53a,b can perform concept-based indexing, and then provide detailed community filtering of each informon.

Third processors 54a–d can receive community informons 59a,b from processors 53a,b, and extract proposed member client informons 61a–d therefrom, responsive to unique member client profiles 62a–d for respective ones of member clients 63a–d. Each user can be represented by multiple member clients in multiple communities. For example, each of users 64a,b can maintain interests in each of the communities serviced by respective second processors 53a,b, and each receive separate member client informons 61b,c and 61a,d, respectively.

Each member client 63a–d provides respective member client feedback 65a–d to fourth processor 55, responsive to the proposed member client informons 61a–d. Based upon the member client feedback 65a–d, processor 55 updates at least one of the preprocessing profile 49, community profiles 48a,b and member client profiles 62a–d. Also, processor 55 adapts at least one of the adaptive content profile 68 and the adaptive collaboration profile 69, responsive to profiles 49, 48a,b, and 62a–d.

Fourth processor 55 can include a plurality of adaptive filters 66a–d for each of the aforementioned profiles and computer storage therefor. It is preferred that the plurality of adaptive filters 66a–d be self-optimizing adaptive filters. Self-optimization can be effected according to a preselected self-optimizing adaptation technique including, for example, one or more of a top-key-word-selection adaptation technique, a nearest-neighbor adaptation technique, a term-weighting adaptation technique, and a probabilistic adaptation technique. Any of the adaptive filters 66a–d may include a neural network. In one present embodiment of the invention, the term-weighting adaptation technique is preferred to be a TF-IDF technique and the probabilistic adaptation technique is preferred to be a MDL technique.

An artisan would recognize that one or more of the processors 52–55 could be combined functionally so that the actual number of processors used in the apparatus 50 could be less than, or greater than, that illustrated in FIG. 2. For example, in one embodiment of the present invention, first processor 52 can be in a single microcomputer workstation, with processors 53–55 being implemented in additional respective microcomputer systems. Suitable microcomputer systems can include those based upon the Intel® Pentium-Pro™ microprocessor. In fact, the flexibility of design presented by the invention allows for extensive scalability of apparatus 50, in which the number of users, and the communities supported may be easily expanded by adding suitable processors. As described in the context of FIG. 1, the interrelation of the several adaptive profiles and respective filters allow trends attributable to individual member clients, individual users, and individual communities in one domain of system 51 to be recognized by, and influence, similar entities in other domains, of system 51 to the extent that the respective entities in the different domains share common attributes.

Figure 3:
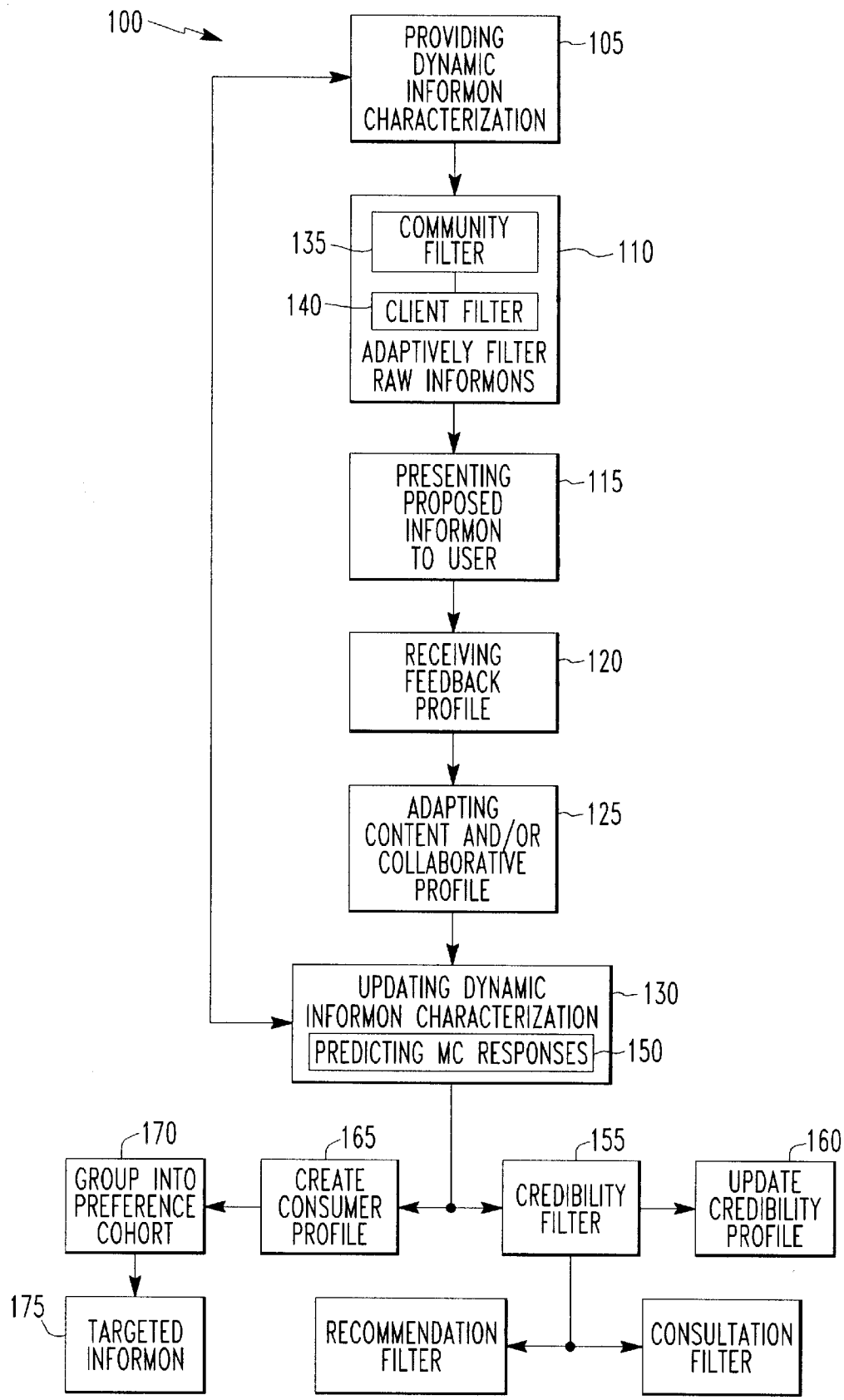
FIG. 3 is a flow diagram for an embodiment of an information filtering method according to the present invention.

The invention herein also comprehends a method 100 for information filtering in a computer system, as illustrated in FIG. 3, which includes providing a dynamic informon characterization (step 105) having a plurality of profiles encoded therein, including an adaptive content profile and an adaptive collaboration profile; and adaptively filtering the raw informons (step 110) responsive to the dynamic informon characterization, thereby producing a proposed informon. The method continues by presenting the proposed informon to the user (step 115) and receiving a feedback profile from the user (step 120), responsive to the proposed informon. Also, the method includes adapting at least one of the adaptive content profile (step 125) and the adaptive collaboration profile responsive to the feedback profile; and updating the dynamic informon characterization (step 130) responsive thereto.

The adaptive filtering (step 110) in method 100 can be machine distributed adaptive filtering that includes community filtering (substep 135), using a community profile for each community, and client filtering (substep 140), similarly using a member client profile for each member client of each community. It is preferred that the filtering in substeps 135 and 140 be responsive to the adaptive content profile and the adaptive collaboration profile. Method 100 comprehends servicing multiple communities and multiple users. In turn, each user may be represented by multiple member clients, with each client having a unique member client profile and being a member of a selected community. It is preferred that updating the dynamic informon characterization (step 130) further include predicting selected subsequent member client responses (step 150).

Method 100 can also include credibility filtering (step 155) of the raw informons responsive to an adaptive credibility profile and updating the credibility profile (step 160) responsive to the user feedback profile. Method 100 further can include creating a consumer profile (step 165) responsive to the user feedback profile. In general, the consumer profile is representative of predetermined consumer preference criteria relative to the communities of which the user is a member client. Furthermore, grouping selected ones (step 170) of the users into a preference cohort, responsive to the preselected consumer preference criteria, can facilitate providing a targeted informon (step 175), such as an advertisement, to the preference cohort.

Figure 4:
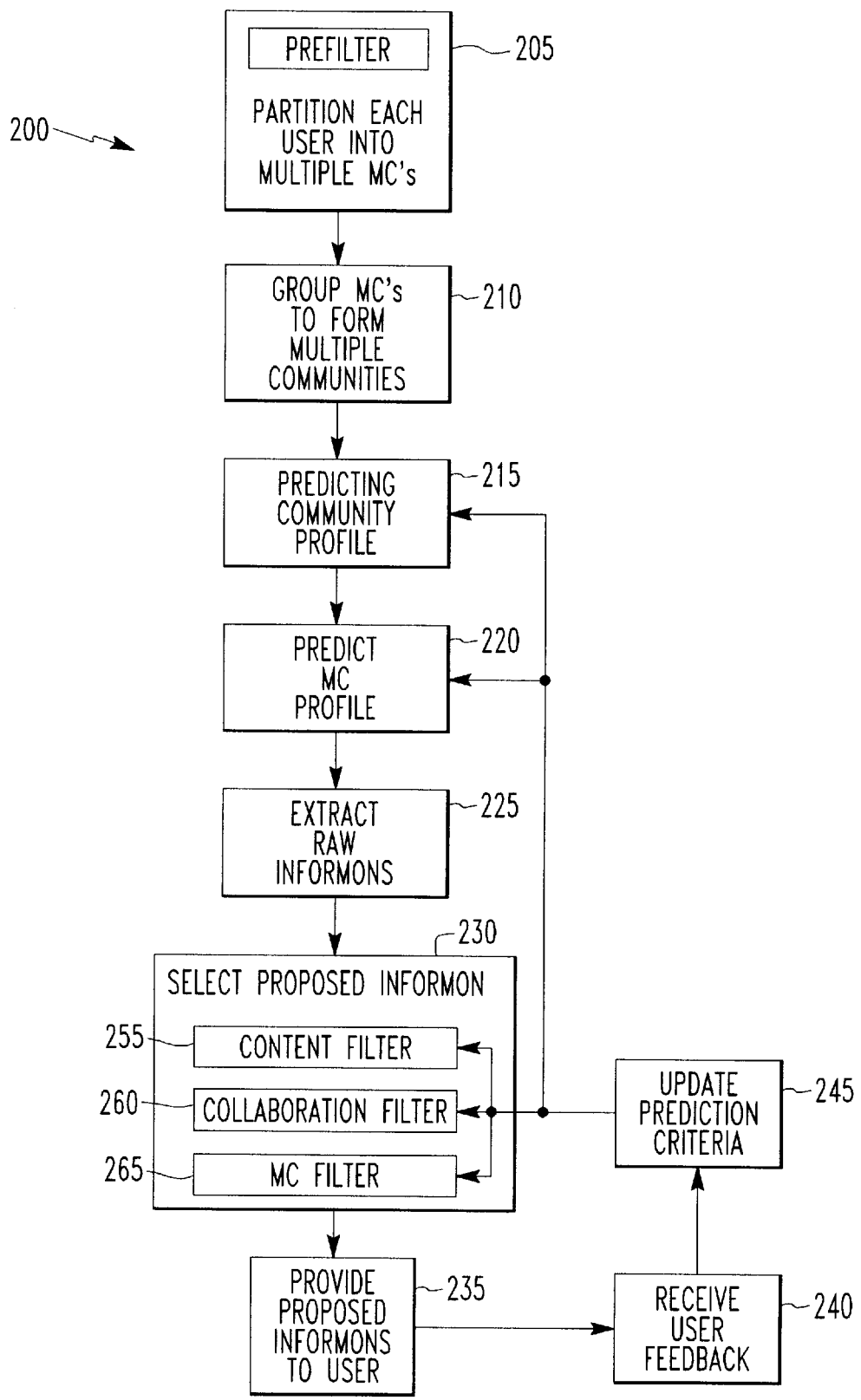
FIG. 4 is a flow diagram for another embodiment of an information filtering method according to the present invention.

FIG. 4 illustrates yet another preferred method embodiment of the invention herein. In general, method 200 includes partitioning (step 205) each user into multiple member clients, each having a unique member client profile with multiple client attributes and grouping member clients (step 210) to form multiple communities with each member client in a particular community sharing selected client attributes with other member clients, thereby providing each community with a unique community profile having common client attributes.

Method 200 continues by predicting a community profile (step 215) for each community using first prediction criteria, and predicting a member client profile (step 220) for a member client in a particular community using second prediction criteria. Method 200 also includes the steps of extracting raw informons (step 225) from a data stream and selecting proposed informons (step 230) from raw informons. The proposed informons generally are correlated with one or more of the common client attributes of a community, and of the member client attributes of the particular member client to whom the proposed informon is offered. After providing the proposed informons to the user (step 235), receiving user feedback (step 240) in response to the proposed informons permits the updating of the first and second prediction criteria (step 245) responsive to the user feedback.

Method 200 further may include prefiltering the data stream (step 250) using the predicted community profile, with the predicted community profile identifying the raw informons in the data stream.

Step 230 of selecting proposed informons can include filtering the raw informons using an adaptive content filter (step 255) responsive to the informon content; filtering the raw informons using an adaptive collaboration filter (step 260) responsive to the common client attributes for the pertaining community; and filtering the raw informons using an adaptive member client filter (step 265) responsive to the unique member client profile.

It is preferred that updating the first and second prediction criteria (step 245) employ a self-optimizing adaptation technique, including, for example, one or more of a top-key-word-selection adaptation technique, a nearest-neighbor adaptation technique, a term-weighting adaptation technique, and a probabilistic adaptation technique. It is further preferred that the term-weighting adaptation technique be a TF-IDF technique and the probabilistic adaptation technique be a minimum description length technique.

Figure 5:
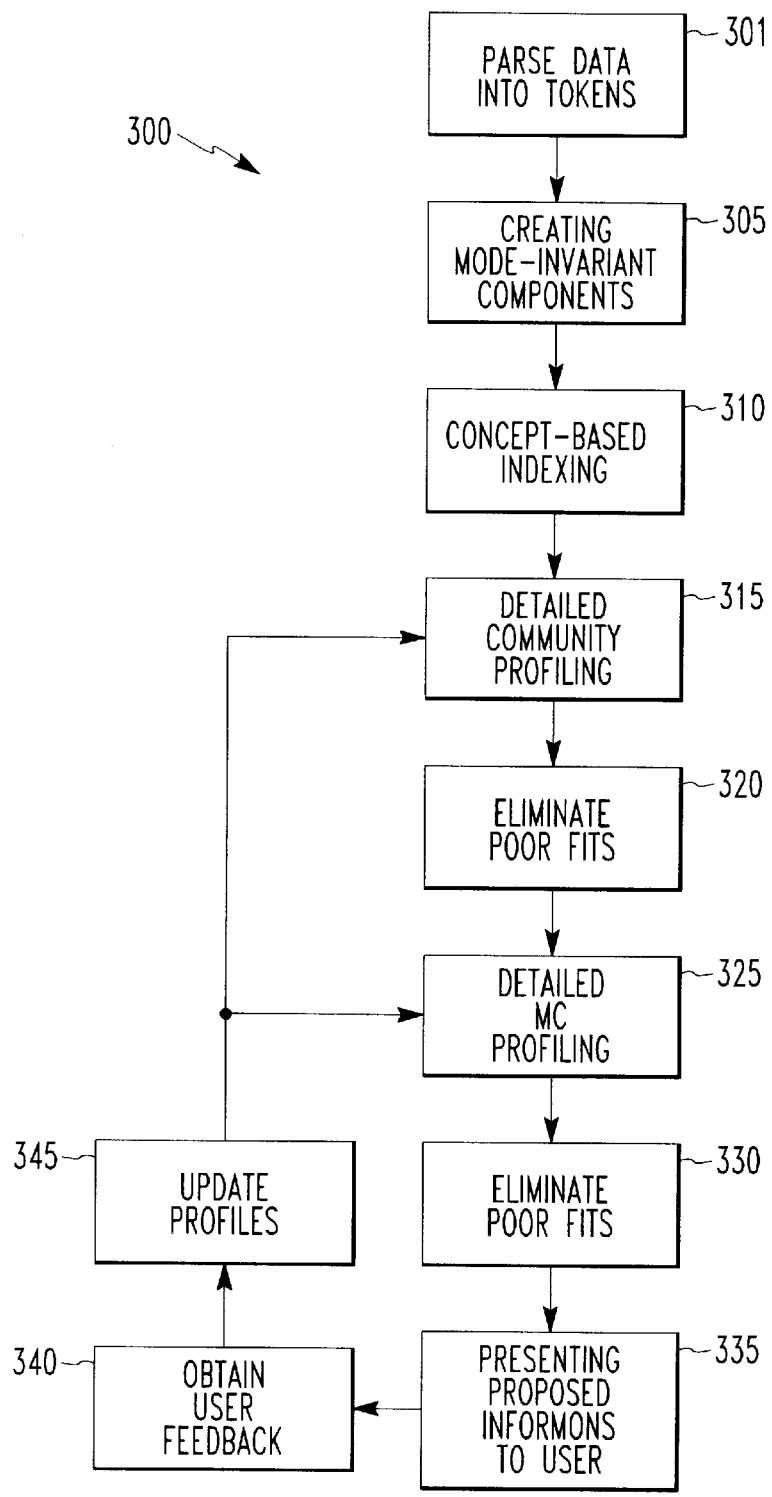
FIG. 5 is a flow diagram for yet another embodiment of an information filtering method according to the present invention.

In a most preferred embodiment, illustrated in FIG. 5, the information filtering method according to the present invention provides rapid, efficient data reduction and routing, or filtering, to the appropriate member client. The method 300 includes parsing the data stream into tokens (step 301); creating a mode-invariant (MI) profile of the informon (step 305); selecting the most appropriate communities for each informon, based on the MI profile, using concept-based indexing (step 310); detailed analysis (step 315) of each informon with regard to its fit within each community; eliminating poor-fitting informons (step 320); detailed filtering of each informon relative to fit for each member client (step 325); eliminating poor-fitting informons (step 330); presenting the informon to the member client/user (step 335); and obtaining the member client/user response, including multiple ratings for different facets of the user's response to the informon (step 340).

In the present invention, it is preferred that coherent portions of the data stream, i.e., potential raw informons, be first parsed (step 301) into generalized words, called tokens. Tokens include punctuation and other specialized symbols that may be part of the structure found in the article headers. For example, in addition to typical words such as "seminar" counting as tokens, the punctuation mark "$" and the symbol "Newsgroup:comp.ai" are also tokens. Using noun phrases as tokens also can be useful.

Next a vector of token counts for the document is created. This vector is the size of the total vocabulary, with zeros for tokens not occurring in the document. Using this type of vector is sometimes called the bag-of-words model. While the bag-of-words model does not capture the order of the tokens in the document, which may be needed for linguistic or syntactic analysis, it captures most of the information needed for filtering purposes.

Although, it is common in information retrieval systems to group the tokens together by their common linguistic roots, called stemming, as a next step it is preferred in the present invention that the tokens be left in their unstemmed form. In this form, the tokens are amenable to being classified into mode-invariant concept components.

Creating a mode-invariant profile (step 305), C, includes creating a conceptual representation for each informon, A, that is invariant with respect to the form-of-expression, e.g., vocabulary and conceptualization. Each community can consist of a "Meta-U-Zine" collection, M, of informons. Based upon profile C, the appropriate communities, if any, for each informon in the data stream are selected by concept-based indexing (step 310) into each M. That is, for each concept C that describes A, put A into a queue $Q_M$, for each M which is related to C. It is preferred that there is a list of Ms that is stored for each concept and that can be easily index-searched. Each A that is determined to be a poor fit for a particular M is eliminated from further processing. Once A has been matched with a particular M, a more complex community profile $P_M$ is developed and maintained for each M (step 315). If A has fallen into $Q_M$, then A is analyzed to determine whether it matches $P_M$ strongly enough to be retained or "weeded" out (step 325) at this stage.

Each A for a particular M is sent to each user's personal agent, or member client U of M, for additional analysis based on the member client's profile (step 325). Each A that fits U's interests sufficiently is selected for U's personal informon, or "U-Zine," collection, Z. Poor-fitting informons are eliminated from placement in Z (step 330). This user-level stage of analysis and selection may be performed on a centralized server site or on the user's computer.

Next, the proposed informons are presented to user U (step 335) for review. User U reads and rates each selected A found in Z (step 340). The feedback from U can consist of a rating for how "interesting" U found A to be, as well as one or more of the following:

Opinion feedback: Did U agree, disagree, or have no opinion regarding the position of A?

Credibility Feedback: Did U find the facts, logic, sources, and quotes in A to be truthful and credible or not?

Informon Qualities: How does the user rate the informons qualities, for example, "interestingness," credibility, funniness, content value, writing quality, violence content, sexual content, profanity level, business importance, scientific merit, surprise/unexpectedness of information content, artistic quality, dramatic appeal, entertainment value, trendiness/importance to future directions, and opinion agreement.

Specific Reason Feedback: Why did the user like or dislike A?
Because of the authority?
Because of the source?
Because A is out-of-date (e.g. weather report from 3 weeks ago)?
Because the information contained in A has been seen already? (I.e., the problem of duplicate information delivery)

Categorization Feedback: Did U liked A? Was it placed within the correct M and Z?

Such multi-faceted feedback queries can produce rich feedback profiles from U that can be used to adapt each of the profiles used in the filtering process to some optimal operating point.

One embodiment of creating a MI profile (step 305) for each concept can include concept profiling, creation, and optimization. Broad descriptors can be used to create a substantially-invariant concept profile, ideally without the word choice used to express concept C. A concept profile can include positive concept clues (PCC) and negative concept clues (NCC). The PCC and NCC can be combined by a processor to create a measure-of-fit that can be compared to a predetermined threshold. If the combined effect of the PCC and NCC exceeds the predetermined threshold, then informon A can be assumed to be related to concept C; otherwise it is eliminated from further processing. PCC is a set of words, phrases, and other features, such as the source or the author, each with an associated weight, that tend to be in A which contains C. In contrast, NCC is a set of words, phrases, and other features, such as the source or the author, each with an associated weight that tend to make it more unlikely that A is contained in C. For example, if the term "car" is in A, then it is likely to be about automobiles. However, if the phrase "bumper car" also is in A, then it is more likely that A related to amusement parks. Therefore, "bumper car" would fall into the profile of negative concept clues for the concept "automobile."

Typically, concept profile C can be created by one or more means. First, C can be explicitly created by user U. Second, C can be created by an electronic thesaurus or similar device that can catalog and select from a set of concepts and the words that can be associated with that concept. Third, C can be created by using co-occurrence information that can be generated by analyzing the content of an informon. This means uses the fact that related features of a concept tend to occur more often within the same document than in general. Fourth, C can be created by the analysis of collections, H, of A that have been rated by one or more U. Combinations of features that tend to occur repeatedly in H can be grouped together as PCC for the analysis of a new concept. Also, an A that one or more U have rated and determined not to be within a particular Z can be used for the extraction of NCC.

Concept profiles can be optimized or learned continually after their creation, with the objective that nearly all As that Us have found interesting, and belonging in M, should pass the predetermined threshold of at least one C that can serve as an index into M. Another objective of concept profile management is that, for each A that does not fall into any of the one or more M that are indexed by C, the breadth of C is adjusted to preserve the first objective, insofar as possible. For example, if C's threshold is exceeded for a given A, C's breadth can be narrowed by reducing PCC, increasing NCC, or both, or by increasing the threshold for C.

In the next stage of filtering, one embodiment of content-based indexing takes an A that has been processed into the set of C that describe it, and determine which M should accept the article for subsequent filtering, for example, detailed indexing of incoming A. It is preferred that a data structure including a database be used, so that the vector of Ms, that are related to any concept C, may be looked-up. Furthermore, when a Z is created by U, the concept clues given by U to the information filter can be used to determine a set of likely concepts C that describe what U is seeking. For example, if U types in "basketball" as a likely word in the associated Z, then all concepts that have a high positive weight for the word "basketball" are associated with the new Z. If no such concepts C seem to pre-exist, an entirely new concept C is created that is endowed with the clues U has given as the starting profile.

To augment the effectiveness of concept-based indexing, it is preferred to provide continual optimization learning. In general, when a concept C no longer uniquely triggers any documents that have been classified and liked by member clients U in a particular community M, then that M is removed from the list of M indexed into by C. Also, when there appears to be significant overlap between articles fitting concept C, and articles that have been classified by users as belonging to M, and if C does not currently index into M, then M can be added to the list of M indexed into by C. The foregoing heuristic for expanding the concepts C that are covered by M, can potentially make M too broad and, thus, accept too many articles. Therefore, it further is preferred that a reasonable but arbitrary limit is set on the conceptual size covered by M.

With regard to the detailed analysis of each informon A with respect to the community profile for each M, each A must pass through this analysis for each U subscribing to a particular M, i.e., for each member client in a particular community. After A has passed that stage, it is then filtered at a more personal, member client level for each of those users. The profile and filtering process are very similar for both the community level and the member client level, except that at the community level, the empirical data obtained is for all U who subscribed to M, and not merely an individual U. Other information about the individual U can be used to help the filter, such as what U thinks of what a particular author writes in other Zs that the user reads, and articles that can't be used for the group-level M processing.

Figure 6:
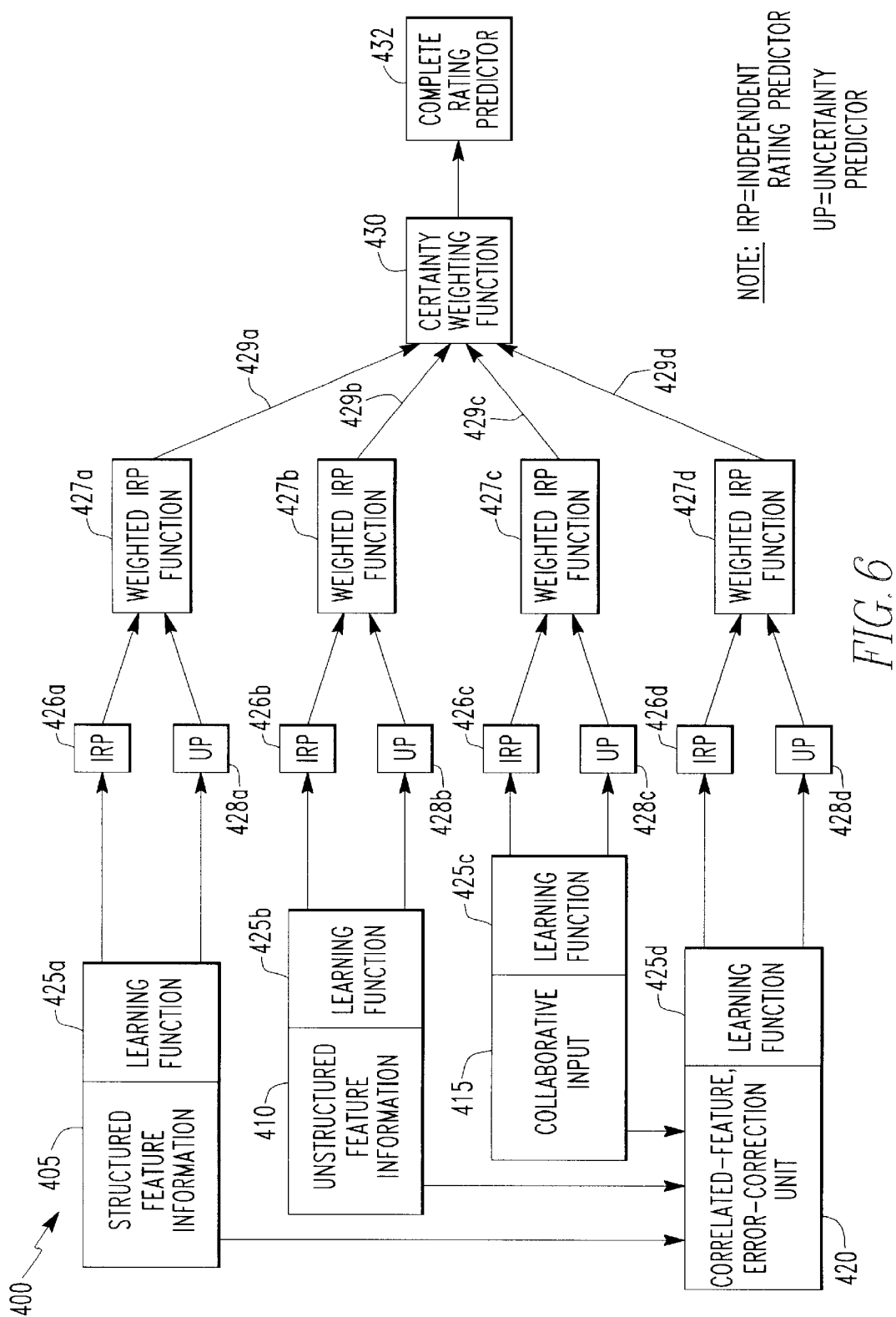
FIG. 6 is an illustration of a three-component-input model and profile with associated predictors.

FIG. 6 illustrates the development of a profile, and its associated predictors. Typically, regarding the structure of a profile 400, the information input into the structure can be divided into three broad categories: (1) Structured Feature Information (SFI) 405; (2) Unstructured Feature Information (UFI) 410; and (3) Collaborative Input (CI) 415. Features derived from combinations of these three types act as additional peer-level inputs for the next level of the rating prediction function, called (4) Correlated-Feature, Error-Correction Units (CFECU) 420. From inputs 405, 410, 415, 420, learning functions 425a–d can be applied to get two computed functions 426a–d, 428a–d of the inputs. These two functions are the Independent Rating Predictors (IRP) 426a–d, and the associated Uncertainty Predictors (UP) 428a–d. IRPs 426a–d can be weighted by dividing them by their respective UPs 428a–d, so that the more certain an IRP 426a–d is, the higher its weight. Each weighted IRP 429a–d is brought together with other IRPs 429a–d in a combination function 427a–d. This combination function 427a–d can be from a simple, weighted, additive function to a far more complex neural network function. The results from this are normalized by the total uncertainty across all UPs, from Certain=zero to Uncertain=infinity, and combined using the Certainty Weighting Function (CWF) 430. Once the CWF 430 has combined the IRPs 426a–d, it is preferred that result 432 be shaped via a monotonically increasing function, to map to the range and distribution of the actual ratings. This function is called the Complete Rating Predictor (CRP) 432.

SFI 405 can include vectors of authors, sources, and other features of informon A that may be influential in determining the degree to which A falls into the categories in a given M. UFI 410 can include vectors of important words, phrases, and concepts that help to determine the degree to which A falls into a given M. Vectors can exist for different canonical parts of A. For example, individual vectors may be provided for subject/headings, content body, related information in other referenced informons, and the like. It is preferred that a positive and negative vector exists for each canonical part.

CI 415 is received from other Us who already have seen A and have rated it. The input used for CI 415 can include, for example, "interestingness," credibility, funniness, content value, writing quality, violence content, sexual content, profanity level, business importance, scientific merit, surprise/unexpectedness of information content, artistic quality, dramatic appeal, entertainment value, trendiness/importance to future directions, and opinion agreement. Each CFECU 420 is a unit that can detect sets of specific feature combinations which are exceptions in combination. For example, author X's articles are generally disliked in the Z for woodworking, except when X writes about lathes. When an informon authored by X contains the concept of "lathes," then the appropriate CFECU 420 is triggered to signal that this is an exception, and accordingly a signal is sent to offset the general negative signal otherwise triggered because of the general dislike for X's informons in the woodworking Z.

As an example, the form of Structured Feature Information (SFI) 405 can include fields such as Author, Source, Information-Type, and other fields previously identified to be of particular value in the analysis. For simplicity, the exemplary SFI, below, accounts only for the Author field. For this example, assume three authors A, B, and C, have collectively submitted 10 articles that have been read, and have been rated as in TABLE 1 (following the text of this specification). In the accompanying rating scheme, a rating can vary between 1 and 5, with 5 indicating a "most interesting" article. If four new articles (11, 12, 13, 14) arrive that have not yet been rated, and, in addition to authors A, B, C, and a new author D has contributed, a simple IRP for the Author field, that just takes sums of the averages, would be as follows:

---

IRP (author) = weighted sum of
    average (ratings given the author so far)
    average (ratings given the author so far in this M)
    average (ratings given all authors so far in this M)
    average (ratings given all authors)
    average (ratings given the author so far by a particular
        user U)*
    average (ratings given the author so far in this M by a
        particular user U)*
    average (ratings given all authors so far in this M by a
        particular user U)*
    average (ratings given all authors by a particular
        user)*

*(if for a personal Z)

---

The purpose of the weighted sum is to make use of broader, more general statistics, when strong statistics for a particular user reading an informon by a particular author, within a particular Z may not yet be available. When stronger statistics are available, the broader terms can be eliminated by using smaller weights. This weighting scheme is similar to that used for creating CWFs 430, for the profiles as a whole. Some of the averages may be left out in the actual storage of the profile if, for example, an author's average rating for a particular M is not "significantly" different from the average for the author across all Ms. Here, "significance" is used is in a statistical sense, and frameworks such as the Minimum Description Length (MDL) Principle can be used to determine when to store or use a more "local" component of the IRP. As a simple example, the following IRP employs only two of the above terms:

---

IRP (author) = weighted sum of
    average (ratings given this author so far in this M)
    average (ratings given all authors so far in this M)

---

Table 2 gives the values attained for the four new articles.

Uncertainty Predictors (UP) 428a–l can be handled according to the underlying data distribution assumptions. It is generally important to the uncertainty prediction that it should approach zero (0) as the IRPs 426a–d become an exact prediction, and should approach infinity when there is no knowledge available to determine the value of an IRP. As an example, the variance of the rating can be estimated as the UP. As recognized by a skilled artisan, combining the variances from the components of the IRP can be done using several other methods as well, depending upon the theoretical assumptions used and the computational efficiency desired. In the present example, shown in Table 3, the minimum of the variances of the components can be used. In the alternative, the UP 428a–l can be realized by:

$$UP_{alt} = \frac{1}{\frac{1}{VAR1} + \frac{1}{VAR2}}$$

An example of Unstructured Feature Information (UFI) 410 can include entities such as text body, video/image captions, song lyrics, subject/titles, reviews/annotations, and image/audio-extracted features, and the like. Using an exemplary entity of a text body, a sample of ten (10) articles that each have some number of 4 words, or tokens, contained therewithin are listed in TABLE 4. As before, a rating can be from 1 to 5, with a rating of 5 indicating "most interesting." This vector can be any weighting scheme for tokens that allows for comparison between a group of collected documents, or informons, and a document, or informon, under question.

As previously mentioned, positive and negative vectors can provide a weighted average of the informons, according to their rating by user U. The weighting scheme can be based on empirical observations of those informons that produce minimal error through an optimization process. Continuing in the example, weighting values for the positive can be:

| Rating | 5 | 4 | 3 | 2 | 1 |
|---|---|---|---|---|---|
| Weight | 1.0 | 0.9 | 0.4 | 0.1 | 0.0 |

Similarly, the negative vector can use a weighting scheme in the opposite "direction":

| Rating | 5 | 4 | 3 | 2 | 1 |
|---|---|---|---|---|---|
| Weight | 0.0 | 0.1 | 0.4 | 0.9 | 1.0 |

Using a TF-IDF scheme, the following token vectors can be obtained:

|  | Token 1 | Token 2 | Token 3 | Token 4 |
|---|---|---|---|---|
| Positive | 0.71 | 0.56 | 0.33 | 0.0 |
| Negative | 0.30 | 0.43 | 0.60 | 0.83 |

In the case where four new documents come in to the information filter, the documents are then compared with the profile vector.

For the purposes of the example herein, only the TF-IDF representation and the cosine similarity metric, i.e., the normalized dot product, will be used. TABLE 5 illustrates the occurrences of each exemplary token. TABLE 6 illustrates the corresponding similarity vector representations using a TF-IDF scheme. The similarity measure produces a result between 0.0–1.0 that is preferred to be remapped to an IRP. This remapping function could be as simple as a linear regression, or a one-node neural net. Here, a simple linear transformation is used, where $IRP(pos) = 1 + (SIM(pos)) \times 4$ and $IRP(neg) = 5 - (SIM(pos)) \times 4$ TABLE 7 illustrates both IRP(pos) and IRP(neg), along with respective positive and negative squared-error, using the 14 articles, or informons, read and rated thus far in the ongoing examples.

It is preferred that an estimate of the uncertainty resulting from a positive or negative IRP be made, and a complex neural net approach could be used. However, a simpler method, useful for this example, is simply to repeat the same process that was used for the IRP but, instead of predicting the rating, it is preferred to predict the squared-error, given the feature vector. The exact square-error values can be used as the informon weights, instead of using a rating-weight lookup table. A more optimal mapping function could also be computed, if indicated by the application.

|  | Token 1 | Token 2 | Token 3 | Token 4 |
|---|---|---|---|---|
| IRP pos. vector | 16.68 | 8.73 | 12.89 | 11.27 |
| IRP neg. vector | 15.20 | 8.87 | 4.27 | 5.04 |

The UPs then can be computed in a manner similar to the IRP's: comparisons with the actual document vectors can be made to get a similarity measure, and then a mapping function can be used to get an UP.

Making effective use of collaborative input (CI) from other users U is a difficult problem because of the following seven issues. First, there generally is no a priori knowledge regarding which users already will have rated an informon A, before making a prediction for a user U, who hasn't yet read informon A. Therefore, a model for prediction must be operational no matter which subset of the inputs happen to be available, if any, at a given time. Second, computational efficiency must be maintained in light of a potentially very large set of users and informons. Third, incremental updates of rating predictions often are desired, as more feedback is reported from users regarding an informon. Fourth, in learning good models for making rating predictions, only very sparse data typically is available for each users rating of each document. Thus, a large "missing data" problem must be dealt with effectively.

Fifth, most potential solutions to the CI problem require independence assumptions that, when grossly violated, give very poor results. As an example of an independence assumption violation, assume that ten users of a collaborative filtering system, called the "B-Team," always rate all articles exactly in the same way, for example, because they think very much alike. Further assume that user A's ratings are correlated with the B-Team at the 0.5 level, and are correlated with user C at the 0.9 level. Now, suppose user C reads an article and rates it a "5". Based on that C's rating, it is reasonable to predict that A's rating also might be a "5". Further, suppose that a member of the B-Team reads the article, and rates it a "2". Existing collaborative filtering methods are likely to predict that A's rating $R_A$ would be:

$R_A = (0.9 \times 5 + 0.5 \times 2)/(0.9 + 0.5) = 3.93$

In principle, if other members of the B-Team then read and rate the article, it should not affect the prediction of A's rating, $R_A$, because it is known that other B-Team members always rate the article with the same value as the first member of the B-Team. However, the prediction for A by existing collaborative filtering schemes would tend to give 10 times the weight to the "2" rating, and would be:

$R_A = (0.9 \times 5 + 10 \times 0.5 \times 2)/(0.9 + 10 \times 0.5) = 2.46$

Existing collaborative filtering schemes do not work well in this case because B-Team's ratings are not independent, and have a correlation among one another of 1. The information filter according to the present invention can recognize and compensate for such inter-user correlation.

Sixth, information about the community of people is known, other than each user's ratings of informons. This information can include the present topics the users like, what authors the users like, etc. This information can make the system more effective when it is used for learning stronger associations between community members. For example, because Users A and B in a particular community M have never yet read and rated an informon in common, no correlation between their likes and dislikes can be made, based on common ratings alone. However, users A and B have both read and liked several informons authored by the same author, X, although Users A and B each read a distinctly different Zs. Such information can be used to make the inference that there is a possible relationship between user A's interests and user B's interests. For the most part, existing collaborative filtering systems can not take advantage of this knowledge.

Seventh, information about the informon under consideration also is known, in addition to the ratings given it so far. For example, from knowing that informon A is about the concept of "gardening", better use can be made of which users' ratings are more relevant in the context of the information in the informon. If user B's rating agrees with user D's rating of articles when the subject is about "politics", but B's ratings agree more with user D when informon A is about "gardening", then the relationship between User B's ratings and User D's ratings are preferred to be emphasized to a greater extent than the relationship between User B and User C when making predictions about informon A.

With regard to the aforementioned fourth, sixth and seventh issues namely, making effective use of sparse, but known, information about the community and the informon, it is possible to determine the influence of user A's rating of an informon on the predicted rating of the informon for a second user, B. For example, where user A and user B have read and rated in common a certain number of informons, the influence of user A's rating of informon D on the predicted rating of informon D for user B can be defined by a relationship that has two components. First, there can be a common "mindset," $S_M$, between user A and user B and informon D, that may be expressed as:

$$M_s = \text{profile}(A) \times \text{profile}(B) \times \text{DocumentProfile}(D).$$

Second, a correlation may be taken between user A's past ratings and user B's past ratings with respect to informons that are similar to D. This correlation can be taken by weighting all informons E that A and B have rated in common by the similarity of E to D, $S_{ED}$:

$$S_{ED} = \text{Weighted\_Correlation}(\text{ratings}(A), \text{ratings}(B))$$

Each of the examples can be weighted by $W_{pr}$=weight for rating pair (rating(A,D),rating(B,D))=DocumentProfile(E)× DocumentProfile (D)

Note that the "X" in the above equation may not be a mere multiplication or cross-product, but rather be a method for comparing the similarity between the profiles. Next, the similarity of the member client profiles and informon content profiles can be compared. A neural network could be used to learn how to compare profiles so that the error in predicted ratings is minimized. However, the invention can be embodied with use of a simple cosine similarity metric, like that previously considered in connection with Unstructured Feature Information (UFI) can be used.

The method used preferably includes more than just the tokens, such as the author and other SFI; and, it is preferred that the three vectors for component also are able to be compared. SFIs may be handled by transforming them into an entity that can be treated in a comparable way to token frequencies that can be multiplied in the standard token frequency comparison method, which would be recognized by a skilled artisan.

Continuing in the ongoing example, the Author field may be used. Where user A and user B have rated authors K and L, the token frequency vector may appear as follows:

|  | Avg. Rating Given to Author K | # in sample | Avg. Rating Given to Author L | # in sample | Avg. Rating Given to Author M | # in sample |
| --- | --- | --- | --- | --- | --- | --- |
| User |  |  |  |  |  |  |
| A | 3.1 | 21 | 1.2 | 5 | N/A | 0 |
| B | 4 | 1 | 1.3 | 7 | 5 | 2 |

Further, the author component of the member client profiles of user A and user B may be compared by taking a special weighted correlation of each author under comparison. In general, the weight is a function F of the sample sizes for user A's and user B's rating of the author, where F is the product of a monotonically-increasing function of the sample size for each of user A and user B. Also, a simple function G of whether the informon D is by the author or not is used. This function can be: G=q if so, and G=p<q if not, where p and q are optimized constraints according to the domain of the filtering system. When there has been no rating of an author by a user, then the function of the zero sample size is positive. This is because the fact that the user did not read anything by the author can signify some indication that the author might not produce an informon which would be highly rated by the user. In this case, the exact value is an increasing function H of the total articles read by a particular user so far, because it becomes more likely that the user is intentionally avoiding reading informons by that author with each subsequent article that has been read but is not prepared by the author. In general, the exact weighting function and parameters can be empirically derived rather than theoretically derived, and so is chosen by the optimization of the overall rating prediction functions. Continuing in the present example, a correlation can be computed with the following weights for the authors K, L and M.

| Author | Weight |
| --- | --- |
| K | F (21, 1, not author)<br>= log (21 + 1) × log (1 + 1) × G (not author)<br>= 0.04 |
| L | F (5, 7, author or D)<br>= log (5 + 1) × log (7 + 1) × G (author)<br>= 0.70 |
| M | F (0.2, not author)<br>= H (26) × log (2 + 1) × G (not author)<br>= 0.02 |

It is preferred that the logarithm be used as the monotonically-increasing function and that p=1, q=0.1. Also used are H=log(sample_size*0.1) and an assumed rating, for those authors who are unrated by a user, to the value of "2." The correlation for the author SFI can be mapped to a non-zero range, so that it can be included in the cosine similarity metric. This mapping can be provided by a simple one-neuron neural network, or a linear function such as, (correlation+1) *$P_O$. Where the $P_O$ is an optimized parameter used to produce the predicted ratings with the lowest error in the given domain for filtering.

An artisan skilled in information retrieval would recognize that there are numerous methods that can be used to effect informon comparisons, particularly document comparisons. One preferred method is to use a TF-IDF weighting technique in conjunction with the cosine similarity metric. SFI including author, can be handled by including them as another token in the vector. However, the token is preferred to be weighted by a factor that is empirically optimized rather than using a TF-IDF approach. Each component of the relationship between user A's and user B's can be combined to produce the function to predict the rating of informon D for user B. The combination function can be a simple additive function, a product function, or a complex function, including, for example, a neural network mapping function, depending upon computational efficiency constraints encountered in the application. Optimization of the combination function can be achieved by minimizing the predicted rating error as an objective.

In addition to determining the relationship between two user's ratings, a relationship that can be used and combined across a large population of users can be developed. This relationship is most susceptible to the aforementioned first, second, third, and fifth issues in the effective use of collaborative input. Specifically, the difficulty with specifying a user rating relationship across a large population of users is compounded by the lack of a priori knowledge regarding a large volume of dynamically changing information that may have unexpected correlation and therefore grossly violate independence assumptions.

In one embodiment of the present invention, it is preferred that users be broken into distributed groups called "mindpools." Mindpools can be purely hierarchical, purely parallel, or a combination of both. Mindpools can be similar to the aforementioned "community" or may instead be one of many subcommunities. These multiple hierarchies can be used to represent different qualities of an article. Some qualities that can be maintained in separate hierarchies include: interestingness; credibility; funniness; valuableness; writing quality; violence content; sexual content; profanity level; business importance; scientific merit; artistic quality; dramatic appeal; entertainment value; surprise or unexpectedness of information content; trendiness or importance to future directions; and opinion agreement. Each of these qualities can be optionally addressed by users with a rating feedback mechanism and, therefore, these qualities can be used to drive separate mindpool hierarchies. Also, the qualities can be used in combinations, if appropriate, to develop more complex composite informon qualities, and more sublime mindpools.

Figure 7:
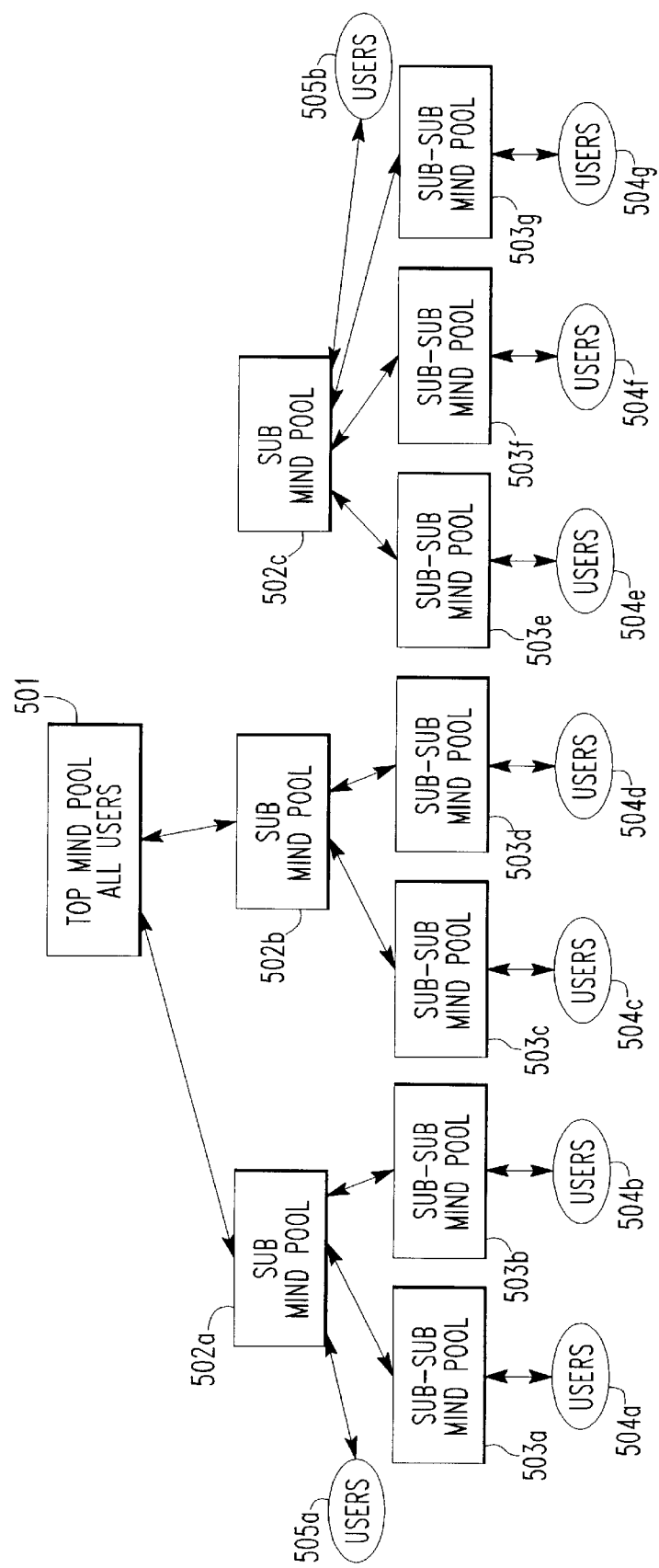
FIG. 7 is an illustration of a mindpool hierarchy.

FIG. 7 illustrates one embodiment of a mindpool hierarchy 500. It is preferred that all users be members of the uppermost portion of the hierarchy, namely, the top mindpool 501. Mindpool 501 can be broken into sub-mindpools 502a–c, which separate users into those having at least some common interests. Furthermore, each sub-mindpool 502a–c can be respectively broken into sub-sub-mindpools 503a–b, 503c–d, 503e,f,g to which users 504a–g are respective members. As used herein, mindpool 501 is the parent node to sub-mindpools 502a–c, and sub-mindpools 502a–c are the respective parent nodes to sub-sub-mindpools 503a–g. Sub-mindpools 502a–c are the child nodes to mindpool 501 and sub-sub-mindpools 503a–g are child nodes to respective mindpools 503a–c. Sub-sub-mindpools 503a–g can be considered to be end nodes. Users 505a,b can be members of sub-mindpool 502a, 502c, if such more closely matches their interests than would membership in a sub-sub-mindpool 503a–g. In general, the objective is to break down the entire population of users into subsets that are optimally similar. For example, the set of users who find the same articles about "gardening" by author A to be interesting but nevertheless found other articles by author A on "gardening" to be uninteresting may be joined in one subset.

A processing means or mindpool manager may be used to handle the management of each of the mindpools 501, 502a–c, and 503a–g. A mindpool manager performs the following functions: (1) receiving rating information from child-node mindpool managers and from those users coupled directly to the manager; (2) passing rating information or compiled statistics of the rating information up to the manager's parent node, if such exists; (3) receiving estimations of the mindpool consensus on the rating for an informon from the manager's parent mindpool, if such exists; and (4) making estimations of the mindpool consensus on the rating for a specific informon for the users that come under the manager's domain; and (5) passing the estimations from function 4 down to either a child-node mindpool or, if the manager is an end node in the hierarchy, to the respective user's CWF, for producing the user's predicted rating. Function 4 also can include combining the estimations received from the manager's parent node, and Uncertainty Predictions can be estimated based on sample size, standard deviation, etc. Furthermore, as alluded to above, users can be allowed to belong to more than one mindpool if they don't fit precisely into one mindpool but have multiple views regarding the conceptual domain of the informon. Also, it is preferred that lateral communication be provided between peer managers who have similar users beneath them to share estimation information. When a rating comes in from a user, it can be passed to the immediate manager(s) node above that user. It is preferred that the manager(s) first decide whether the rating will effect its current estimation or whether the statistics should be passed upward to a parent-node. If the manager estimation would change by an amount above an empirically-derived minimum threshold, then the manager should pass that estimation down to all of its child-nodes. In the event that the compiled statistics are changed by more than another minimum threshold amount, then the compiled statistics should be passed to the manager's parent-node, if any ,and the process recurses upward and downward in the hierarchy.

Because no mindpool manager is required to have accurate information, but just an estimation of the rating and an uncertainty level, any manager may respond with a simple average of all previous documents, and with a higher degree of uncertainty, if none of its child-nodes has any rating information yet. The preferred distributed strategy tends to reduce the communication needed between processors, and the computation tends to be pooled, thereby eliminating a substantial degree of redundancy. Using this distributed strategy, the estimations tend to settle to the extent that the updating of other nodes, and the other users predictions are minimized. Therefore, as the number of informons and users becomes large, the computation and prediction updates grow as the sum of the number of informons and the number of users, rather than the product of the number of informons and the number of users. In addition, incremental updates can be accomplished by the passing of estimations up and down the hierarchy. Incremental updates of rating predictions continue to move until the prediction becomes stable due to the large sample size. The distributed division of users can reduce the effects of independent assumption violations. In the previous example with the B-Team of ten users, the B-Team can be organized as a particular mindpool. With the additional ratings from each of the B-Team members, the estimation from the B-Team mindpool typically does not change significantly because of the exact correlation between the members of that mindpool. This single estimation then can be combined with other estimations to achieve the desired result, regardless of how many B-Team members have read the article at any given time.

The mindpool hierarchies can be created by either computer-guided or human-guided methods. If the hierarchy creation is human-guided, there often is a natural breakdown of people based on information such as job position, common interests, or any other information that is known about them. Where the mindpool hierarchy is created automatically, the previously described measure of the collaborative input relationship between users can be employed in a standard hierarchical clustering algorithm to produce each group of users or nodes in the mindpool hierarchy. Such standard hierarchical clustering algorithms can include, for example, the agglomerative method, or the divide-and-conquer method. A skilled artisan would recognize that many other techniques also are available for incrementally-adjusting the clusters as new information is collected. Typically, clustering is intended to (1) bring together users whose rating information is clearly not independent; and (2) produce mindpool estimations that are substantially independent among one another.

Estimations are made in a manner similar to other estimations described herein. For example, for each user or sub-mindpool (sub-informant), a similarity between the sub-informant and the centroid of the mindpool can be computed in order to determine how relevant the sub-informant is in computing the estimation. Uncertainty estimators also are associated with these sub-informants, so that they can be weighted with respect to their reliability in providing the most accurate estimation. Optionally, the informon under evaluation can be used to modulate the relevancy of a sub-informant. This type of evaluation also can take advantage of the two previously-determined collaborative information relationship components, thereby tending to magnify relationships that are stronger for particular types of informons than for others. Once a suitable set of weights are established for each user within a mindpool for a particular informon, a simple weighted-average can be used to make the estimation. It is preferred that the "simple" weighted average used be more conservative regarding input information that a simple independent linear regression. Also, the overall Uncertainty can be derived from the Uncertainty Predictions of the sub-informants, in a manner similar to the production of other uncertainty combination methods described above. Approximations can be made by pre-computing all terms that do not change significantly, based on the particular informon, or the subset of actual ratings given so far to the mindpool manager.

As stated previously, the correlated-feature error-correction units (CFECUs) are intended to detect irregularities or statistical exceptions. Indeed, two objectives of the CFECU units are to (1) find non-linear exceptions to the general structure of the three aforementioned types of inputs (SFI, UFI, and CI); and (2) find particular combinations of informon sub-features that statistically stand out as having special structure which is not captured by the rest of the general model; and (3) trigger an additional signal to the CFECU's conditions are met, in order to reduce prediction error. The following exemplifies the CFECU operation:

| User B's Avg. Rating of of Informons About | | |
|---|---|---|
| | Gardening | Politics |
| Author A's Articles | 4.5 | 1.2 |
| Other Authors | 1.4 | 2 |
| Weighted by Topic | 1.68 | 1.87 |

| User B's number of Informons Read About | | | |
|---|---|---|---|
| | Gardening | Politics | Average over Topics |
| Author A's Articles | 7 | 40 | 1.69 |
| Other Authors | 70 | 200 | 1.84 |

In this example, it is desired that author A's informon D about gardening have a high predicted rating for user B. However, because the average rating for author A by user B is only 1.69, and the average rating for the gardening concept is only 1.68, a three-part model (SFI-UFI-CI) that does not evaluate the informon features in combination would tend to not rank informon D very highly. In this case, the first CFECU would first find sources of error in past examples. This could include using the three-part model against the known examples that user B has rated so far. In this example, seven articles that user B has rated, have an average rating of 4.5, though even the three-part model only predicts a rating of about 1.68. When such a large error appears, and has statistical strength due to the number of examples with the common characteristics of, for example, the same author and topic, a CFECU is created to identify that this exception to the three-part model has been triggered and that a correction signal is needed. Second, it is preferred to index the new CFECU into a database so that, when triggering features appear in an informon, for example, author and topic, the correction signal is sent into the appropriate CWF. One method which can be used to effect the first step is a cascade correlation neural network, in which the neural net finds new connection neural net units to progressively reduce the prediction error. Another method is to search through each informon that has been rated but whose predicted rating has a high error, and storing the informons profile.

When "enough" informons have been found with high error and common characteristics, the common characteristics can be joined together as a candidate for a new CFECU. Next, the candidate can be tested on all the samples, whether they have a high prediction or a low prediction error associated with them. Then, the overall error change (reduction or increase) for all of the examples can be computed to determine if the CFECU should be added to the informon profile. If the estimated error reduction is greater than a minimum threshold level, the CFECU can be added to the profile. As successful CFECU are discovered for users' profiles, they also can be added to a database of CFECU's that may be useful for analyzing other profiles. If a particular CFECU has a sufficiently broad application, it can be moved up in the filtering process, so that it is computed for every entity once. Also, the particular CFECU can be included in the representation that is computed in the pre-processing stage as a new feature. In general, the estimation of the predicted rating from a particular CFECU can be made by taking the average of those informons for which the CFECU responds. Also, the Uncertainty can be chosen such that the CFECU signal optimally outweighs the other signals being sent to the CWF. One method of self-optimization that can be employed is, for example, the gradient descent method, although a skilled artisan would recognize that other appropriate optimization methods may be used.

All publications mentioned in this specification are indicative of the level of skill in the art to which this invention pertains. All publications are herein incorporated by reference to the same extent as if each individual publication was specifically but individually indicated to be incorporated by reference.

Furthermore, many alterations and modifications may be made by those having ordinary skill in the art without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

TABLE 1

| Article | Author | Rating given |
|---------|--------|--------------|
| 1 | A | 5 |
| 2 | B | 1 |
| 3 | B | 2 |
| 4 | B | 5 |
| 5 | C | 2 |
| 6 | C | 2 |
| 7 | C | 1 |
| 8 | C | 2 |
| 9 | C | 2 |
| 10 | C | 2 |

TABLE 2

| Article | Author | avg (author) | normalized weight | weight | avg (all auth) | normalized weight | weight |
|---------|--------|--------------|-------------------|--------|----------------|-------------------|--------|
| IRP (author) | | | | | | | |
| 11 | A | 5.00 | 3.12 | 0.86 | 2.40 | 0.49 | 0.14 | 4.65 |
| 12 | B | 2.67 | 0.23 | 0.32 | 2.40 | 0.49 | 0.66 | 2.49 |
| 13 | C | 1.83 | 6.00 | 0.92 | 2.40 | 0.49 | 0.06 | 1.86 |
| 14 | D | N/A | 0.00 | 0.00 | 2.40 | 0.49 | 1.00 | 2.40 |

TABLE 3

| Article [alt.] | Author | var (author) | var (all auth.) | UP (author) | UP (author) |
|----------------|--------|--------------|-----------------|-------------|-------------|
| 11 | A | 2.25 | 2.04 | 2.04 | 1.07 |
| 12 | B | 4.33 | 2.04 | 2.04 | 1.39 |
| 13 | C | 0.17 | 2.04 | 0.17 | 0.15 |
| 14 | D | N/A | 2.04 | 2.04 | 2.04 |

TABLE 4

| Article | Token 1 | Token 2 | Token 3 | Token 4 | Rating |
|---------|---------|---------|---------|---------|--------|
| 1 | 2 | — | — | — | 5 |
| 2 | 1 | 2 | — | — | 5 |
| 3 | 2 | 2 | 1 | — | 4 |
| 4 | 2 | — | 1 | — | 4 |
| 5 | 1 | — | — | 1 | 1 |
| 6 | 3 | 1 | 3 | 1 | 3 |
| 7 | — | 1 | 3 | 1 | 2 |
| 8 | — | — | 3 | 2 | 2 |
| 9 | — | 2 | — | 2 | 2 |
| 10 | — | — | — | 2 | 1 |
| Frequency | 11 | 8 | 11 | 9 | |

TABLE 5

| Article | Token 1 | Token 2 | Token 3 | Token 4 |
|---------|---------|---------|---------|---------|
| 11 | 3 | — | — | — |
| 12 | 1 | — | 1 | 4 |
| 13 | — | 5 | 5 | — |
| 14 | — | — | — | — |

TABLE 6

| Article | Token 1 | Token 2 | Token 3 | Token 4 | Positive Similarity | Negative Similarity |
|---------|---------|---------|---------|---------|---------------------|---------------------|
| 1 | 0.18 | 0.00 | 0.00 | 0.00 | 0.73 | 0.26 |
| 2 | 0.09 | 0.25 | 0.00 | 0.00 | 0.80 | 0.44 |
| 3 | 0.18 | 0.25 | 0.09 | 0.00 | 0.96 | 0.60 |
| 4 | 0.18 | 0.00 | 0.09 | 0.00 | 0.81 | 0.49 |
| 5 | 0.09 | 0.00 | 0.00 | 0.11 | 0.54 | 0.73 |
| 6 | 0.27 | 0.13 | 0.27 | 0.11 | 0.89 | 0.85 |
| 7 | 0.00 | 0.13 | 0.27 | 0.11 | 0.55 | 0.89 |
| 8 | 0.00 | 0.00 | 0.27 | 0.22 | 0.33 | 0.91 |
| 9 | 0.00 | 0.25 | 0.00 | 0.22 | 0.50 | 0.76 |
| 10 | 0.00 | 0.00 | 0.00 | 0.22 | 0.10 | 0.73 |

TABLE 6-continued

| Article | Token 1 | Token 2 | Token 3 | Token 4 | Positive Similarity | Negative Similarity |
|---------|---------|---------|---------|---------|---------------------|---------------------|
| 11 | 0.27 | 0.00 | 0.00 | 0.00 | 0.73 | 0 26 |
| 12 | 0.09 | 0.00 | 0.09 | 0.44 | 0.31 | 0.86 |
| 13 | 0.00 | 0.63 | 0.45 | 0.00 | 0.67 | 0.64 |
| 14 | 0.00 | 0.00 | 0.00 | 0.00 | 0.50 | 0.50 |

TABLE 7

| Article | IRP (pos) | IRP (neg) | Act. Rat. | sq. err. (pos) | sq. err. (neg) |
|---------|-----------|-----------|-----------|----------------|----------------|
| 1 | 3.93 | 3.95 | 5 | 1.14 | 1.09 |
| 2 | 4.19 | 3.25 | 5 | 0.66 | 3 06 |
| 3 | 4 84 | 2.61 | 4 | 0.71 | 1.94 |
| 4 | 4.23 | 3.03 | 4 | 0.05 | 0.94 |
| 5 | 3.18 | 2.09 | 1 | 4.74 | 1.18 |
| 6 | 4.58 | 1.61 | 3 | 2.50 | 1.93 |
| 7 | 3.21 | 1.44 | 2 | 1.45 | 0.32 |
| 8 | 2.31 | 1.37 | 2 | 0.10 | 0.40 |
| 9 | 3.01 | 1.96 | 2 | 1.03 | 0.00 |
| 10 | 1.41 | 2.09 | 1 | 0.17 | 1.20 |
| 11 | 3.93 | 3.95 | | | |
| 12 | 2.24 | 1.55 | | | |
| 13 | 3.68 | 2.44 | | | |
| 14 | 3.00 | 3.00 | | | |

What is claimed is:

1. A method for information filtering in a computer system receiving a data stream from a computer network, the data stream having raw informons being of interest to a user, the method comprising the steps of:
   a. providing a dynamic informon characterization having a plurality of profiles encoded therein, the plurality of profiles including an adaptive content profile and an adaptive collaboration profile;
   b. adaptively filtering the raw informons responsive to the dynamic informon characterization, producing a proposed informon thereby;
   c. presenting the informon to the user;
   d. receiving feedback data from the user, responsive to the proposed informon; and
   e. updating the dynamic informon characterization by adapting at least one of the adaptive content profile and the adaptive collaboration profile responsive to the feedback data.

2. The method of claim 1 wherein the step of adaptively filtering is distributively executed through multiple filter levels.

3. The method of claim 2 wherein the step of adaptively filtering includes substeps of community filtering and client filtering in successive filter levels, respectively using a community profile and a member client profile being responsive to the adaptive content profile and the adaptive collaboration profile.

4. The method of claim 3 wherein the client filtering substep employs a user profile representing at least one member client profile.

5. The method of claim 1 further comprising the steps of:
   a. credibility filtering the informons responsive to an adaptive credibility profile; and
   b. updating the credibility profile responsive to the feedback data.

6. The method of claim 3 further comprising the steps of:
   a. credibility filtering informons responsive to an adaptive credibility profile; and
   b. updating the credibility profile responsive to selected member client responses.

7. The method of claim 6 wherein the step of updating the credibility profile further includes the step of predicting selected subsequent ones of the plurality of user responses.

8. The method of claim 1 wherein the step of adapting at least one of the adaptive content profile and the adaptive collaboration profile responsive to the feedback profile further includes the step of optimally adapting the adaptive content profile and the adaptive collaboration profiles.

9. The method of claim 8 wherein the step of optimally adapting further includes the step of self-optimizing the adaptive content profile and the collaboration profile using a selected self-optimizing technique.

10. The method of claim 8 wherein the step of adapting at least one of the adaptive content profile and the adaptive collaboration profile responsive to the feedback data further includes the step of optimally adapting the adaptive content profile and the adaptive collaboration profile.

11. The method of claim 10 wherein the step of optimally adapting further includes the step of self-optimizing the adaptive content profile and the adaptive collaboration profile using a selected self-optimizing technique.

12. The method of claim 3 further comprising the steps of:
   a. credibility filtering the informons responsive to an adaptive credibility profile, the credibility filtering being distributed; and
   b. updating the dynamic informon characterization responsive to at least one of the adaptive content profile, the adaptive collaboration profile, and the adaptive credibility profile.

13. The method of claim 1 further comprising the step of creating a consumer profile responsive to the feedback data, the consumer profile being representative of predetermined consumer preference criteria relative to communities of which the user is a member client.

14. The method of claim 1 wherein the user is one of a plurality of users, each user being a plurality of member clients, each member client being a member of a selected community and having a unique member client profile relative to the selected community, selected member clients of each of the plurality of users being grouped into preselected interest groups, responsive to the respective feedback profiles, and the adaptive collaborative profile being updated responsive to respective feedback data of selected users.

15. The method of claim 14 wherein the interest groups are representative of user interests and community norms.

16. The method of claim 1 wherein the user provides a temporally-spaced plurality of feedback responses and the adaptive content profile is adapted therewith according to a preselected adaptation technique.

17. The method of claim 5 wherein the user is one of a plurality of users, each user being a plurality of member clients, each member client uniquely corresponding with one of a plurality of communities and providing respective feedback data, selected ones of the plurality of client members being grouped into preselected interest groups responsive to the respective feedback data, and the adaptive credibility profile being updated responsive to the respective feedback data of the selected ones.

18. The method of claim 13 wherein the user is one of a plurality of users and the consumer profile is one of a plurality of consumer profiles, and further comprising the step of grouping selected ones of the plurality of users into a preference cohort responsive to the preselected consumer preference criteria.

19. The method of claim 18 further comprising the step of providing a targeted informon to the preference cohort, the targeted informon corresponding to the predetermined consumer preference criteria relative to the preference cohort.

20. The method of claim 3 wherein the dynamic informon characterization includes a prefiltering profile, an adaptive broker filtering profile, and a member client profile, and wherein the step of adaptively filtering includes the steps of:
   a. prefiltering the data stream according to the prefiltering profile, thereby extracting a plurality of raw informons from the data stream, the prefiltering profile being responsive at least to the adaptive content profile;
   b. filtering the raw informons according to the adaptive broker profile, the adaptive broker profile responding to the adaptive collaborative profile and the adaptive content profile; and
   c. further filtering the raw informons according to an adaptive member client profile.

21. The method of claim 1 wherein the dynamic informon characterization includes prediction rules and category rules, the prediction rules and the category rules being responsive to the feedback data.

22. The method of claim 21 further comprising the step of learning the category rules using a preselected category rule learning technique.

23. The method of claim 21 further comprising the step of learning the prediction rule using a preselected prediction rule learning technique.

24. The method of claim 1 wherein the step of providing the dynamic informon characterization includes generating the characterization using a preselected learning technique.

25. The method of claim 24 wherein the preselected learning technique includes at least one of a top-keyword-selection learning technique, a nearest-neighbor learning technique, a term-weighting learning technique, a neural net learning technique, and a probabilistic learning technique.

26. The method of claim 25 wherein the term-weighting learning technique is a TF-IDF technique and the probabilistic learning technique is a minimum description length technique.

27. The method of claim 22 wherein the category rules include a plurality of category profile attributes, and each informon has a plurality of informon category attributes corresponding to respective ones of the plurality of category profile attributes, the category profile attributes being responsive to the user feedback data, the method further comprising the steps of:
   a. deriving a figure-of-merit for each of the informon category attributes relative to the category profile attributes;
   b. combining the figures-of-merit using a predetermined adaptive function, thereby producing a category fitness figure-of-merit; and
   c. incorporating the category fitness figure-of-merit into the dynamic informon characterization.

28. The method of claim 27 wherein:
   a. the plurality of informon attributes each include at least one of an informon keyword, a fixed informon representation, informon author, actual and predicted informon destinations, and informon feature values; and
   b. the plurality of category profile attributes each include at least one of category keyword, category fixed representation, ranked category authors, category destination, recent relevant subjects, and category feature values.

29. A method for information filtering in a computer system receiving a data stream from a computer network having a plurality of users, the data stream having informons embedded therein, the method comprising the steps of:
   a. partitioning each user into a plurality of member clients, each member client having a plurality of client attributes;
   b. grouping member clients to form a plurality of communities, each community including selected clients of the plurality of member clients, selected client attributes of ones of the selected clients being comparable to client attributes of others of the selected clients thereby providing each community with a community profile having a set of common client attributes;
   c. providing at least one community profile for each community using first prediction criteria;
   d. providing at least one member client profile for a client in a community using second prediction criteria;
   e. extracting raw informons from the data stream, each of the raw informons having an information content which has a threshold level of user relevancy;
   f. selecting proposed informons from the informons employing the community and member client profiles;
   g. providing the proposed informons to the user;
   h. receiving user feedback in response to the proposed informons; and
   i. updating at least one of the first and second prediction criteria responsive to the user feedback.

30. The method of claim 29 wherein the step of extracting the raw informons further comprises prefiltering the data stream using the community profiles.

31. The method of claim 29 wherein the step of updating at least one of the first and second prediction criteria further includes updating using an optimizing adaptation technique.

32. The method of claim 31 wherein the optimizing adaptation technique is a self-optimizing adaptation technique.

33. An information filter apparatus in a computer system receiving a data stream from a computer network, the data stream having informons embedded therein, the apparatus comprising:
   a. extraction means coupled to the computer network for identifying and extracting informons from the data stream, each of the informons having information content meeting a threshold level of user relevancy, at least one of the raw informons being of interest to a user having a user profile, the user being a member of a network community having a community profile, the extracting means being coupled to the computer network;
   b. filter means for adaptively filtering the informons responsive to an adaptive collaboration profile and an adaptive content profile reflecting the community and user profiles and producing a proposed informon thereby, the content of the informon being filtered according to the adaptive collaboration and content profiles, the filter means being coupled with the extraction means;
   c. communication means for conveying the proposed informon to the user and receiving a feedback response therefrom, the feedback response providing feedback data, the communication means being coupled with the filter means;
   d. first adaptation means for adapting at least one of the collaboration profile and the adaptive content profile responsive to the feedback data from the user, the first adaptation means being coupled to the filter means; and
   e. computer storage means for storing the adaptive collaborative profile and the adaptive content profile, the storage means being coupled to the filter means.

34. The apparatus of claim 33 wherein the filter means further filters the raw informon according to a credibility profile, the credibility profile being responsive to at least one of the adaptive collaboration profile and the adaptive content profile.

35. The apparatus of claim 33 wherein the computer network includes a plurality of network communities coupled with the extraction means, each network community having a plurality of users, each user corresponding to a plurality of member clients, and wherein apparatus further includes:
   a. computer storage for the adaptive collaboration profile and the adaptive content profile for each of the plurality of network communities;
   b. computer storage for the community profile for each of the plurality of communities and the member client profile for each of the plurality of member clients, each member client being coupled to a respective community; and
   c. a plurality of adaptive filters in the filter means for each of the adaptive collaboration and adaptive content and community and member client profiles, each of the adaptive filters being responsive to a respective one of the profiles.

36. The apparatus of claim 35 wherein selected ones of the plurality of adaptive filters are self-optimizing adaptive filters.

37. The apparatus of claim 36 wherein each of the self-optimizing adaptive filters use a respective preselected adaptation technique.

38. The apparatus of claim 37 wherein the respective preselected adaptation technique includes at least one of a top-key-word-selection learning technique, a nearest-neighbor learning technique, a term-weighting learning technique, and a probabilistic learning technique.

39. The apparatus of claim 37 further comprising a neural network and the respective preselected adaptation technique is a preselected neural network learning technique.

40. The apparatus of claim 38 further comprising a neural network and the respective preselected adaptation technique including a preselected neural network learning technique.

41. The apparatus of claim 35 wherein the filter means further includes an adaptive credibility filter for filtering the raw informon according to a credibility profile, the credibility profile being responsive to at least one of the adaptive collaboration profile and the adaptive content profile, and the apparatus further includes computer storage for the credibility profile.

42. An information filtering apparatus in a computer system receiving a data stream from a computer network, the data stream having informons embedded therein, the apparatus comprising:
  a. a first processor coupled to the computer network and receiving the data stream therefrom, the first processor extracting informons from the data stream, responsive to a preprocessing profile;
  b. a second processor coupled to the first processor and receiving the informons therefrom, the second processor extracting proposed community informons from the informons, responsive to a community profile;
  c. a third processor coupled to the second processor and receiving the proposed community informons therefrom, the third processor extracting proposed member client informons from the proposed community informons, responsive to a member client profile;
  d. a fourth processor coupled to the first, the second, and the third processors, the fourth processor:
    (1) being in communication with the member client;
    (2) receiving member client feedback data from a user responsive to the proposed member client informon;
    (3) adapting adaptive content profile data and adaptive collaboration profile data responsive to the feedback data from a user, and
    (4) updating at least one of the preprocessing profile, the community profile, and the member client profile responsive to the the adaptive content profile data.

43. The apparatus of claim 42, further comprising:
  a. computer storage for the adaptive collaboration profile and the adaptive content profile for each of a plurality of communities;
  b. computer storage for the community profile for each of the plurality of communities and the member client profile for each of the plurality of member clients, each member client being coupled to a respective community; and
  c. a plurality of adaptive filters in the filter means for each of the adaptive collaboration and adaptive content and community and member client profiles, each of the adaptive filters being responsive to a respective one of the profiles.

44. The apparatus of claim 43 wherein the fourth processor further includes an adaptive credibility filter for filtering the raw informon according to an adaptive credibility profile, and wherein the step of updating includes updating the adaptive credibility profile responsive to at least one of the adaptive collaboration profile and the adaptive content profile, and the apparatus further includes computer storage for the credibility profile.

45. The apparatus of claim 44 wherein selected ones of the plurality of adaptive filters are self-optimizing adaptive filters using a respective preselected adaptation technique.

46. The apparatus of claim 45 wherein the respective preselected adaptation technique includes at least one of a top-key-word-selection learning technique, a nearest-neighbor learning technique, a term-weighting learning technique, and a probabilistic learning technique.

47. The apparatus of claim 45 further comprising a neural network and the respective preselected adaptation technique is a preselected neural network learning technique.

48. The apparatus of claim 46 further comprising a neural network and the respective preselected adaptation technique including a preselected neural network learning technique.

49. A computer program product having a computer readable medium having computer program logic recorded thereon for information filtering in a computer system receiving a data stream from a computer network, the data stream having informons embedded therein, the informons having information content, a user having a user profile and being a member of a community having a community profile, the computer program product comprising:
  a. means for providing a dynamic informon characterization having a plurality of profiles encoded therein, the plurality of profiles including an adaptive content profile and an adaptive collaboration profile, the adaptive content profile being responsive to content of the informon, the adaptive collaboration profile being correlated with the user profile and the community profile;
  b. means for adaptively filtering the informons responsive to the dynamic informon characterization, producing a proposed informon thereby;
  c. means presenting the proposed informon to the user;
  d. means for receiving feedback data from the user, responsive to the proposed informon; and
  e. means for updating the dynamic informon characterization by adapting at least one of the adaptive content profile and the adaptive collaboration profile responsive to the feedback data.

50. The computer program product of claim 49 wherein the means for adaptively filtering is distributed through multiple filtering levels and includes means for community filtering and means for client filtering, each of the means for community filtering and client filtering having a community profile and a client profile responsive to the adaptive content profile and the adaptive collaboration profile, the dynamic informon characterization responsive to the community profile and the member client profile, the community profile being at least partially correlated with the member client profile.

51. The computer program product of claim 50 further comprising means for communicating with a plurality of users and a plurality of communities, each community having a respective community profile, each user being represented by a plurality of clients, each client being a member client of a selected one of the plurality of communities and having a member client profile.

52. The computer program product of claim 51 wherein the feedback data includes a plurality of member client responses to the proposed informon; and further comprising means for updating the adaptive collaboration profile responsive to the plurality of member client responses.

53. The computer program product of claim 49, further comprising:
   a. means for credibility filtering the informons responsive to an adaptive credibility profile, the credibility filtering being distributed; and
   b. means for updating the dynamic informon characterization responsive to at least one of the adaptive content profile, the adaptive collaboration profile, and the credibility profile.

54. The computer program product of claim 49 wherein the means for adapting further includes means for self-optimizing the adaptive content profile and the adaptive collaboration profile using a selected self-optimizing technique, and the selected self-optimizing technique includes at least one of a top-key-word-selection learning technique, a nearest-neighbor learning technique, a term-weighting learning technique, a neural network technique, and a probabilistic learning technique.

55. The computer program product of claim 49 wherein each of the informons includes at least one of textual data, visual data, audio data, patterned data, and multimedia data.

56. The computer program product of claim 49, further comprising:
   a. means for creating a consumer profile responsive to the feedback profile, the consumer profile being representative of predetermined consumer preference criteria relative to the communities of which the user is a member, wherein the user is one of a plurality of users and the consumer profile is one of a plurality of consumer profiles;
   b. means for grouping selected ones of the plurality of users into a preference cohort responsive to the predetermined consumer preference criteria; and
   c. means for providing a targeted informon to the preference cohort, the targeted informon corresponding to the predetermined consumer preference criteria relative to the preference cohort.

57. A computer program product having a computer-readable medium having computer program logic recorded thereon for information filtering in a computer system receiving a data stream from a computer network having a plurality of users, the data stream having informons embedded therein, the computer program product comprising:
   a. means for partitioning each user into a plurality of member clients, each member client having a unique member client profile, each profile having a plurality of client attributes;
   b. means for grouping member clients to form a plurality of communities, each community including selected clients of the plurality of member clients, selected client attributes of ones of the selected clients being comparable to client attributes of others of the selected clients thereby providing each community with a community profile having common client attributes;
   c. means for predicting a community profile for each community using first prediction criteria;
   d. means for predicting a member client profile for each member client in a community using second prediction criteria;
   e. means for extracting informons from the data stream, each of the raw informons having a content of information meeting a threshold level of relavancy;
   f. means for selecting proposed informons from the raw informons, the proposed informons being correlated with at least one of the common client attributes and the member client attributes;
   g. means for providing the proposed informons to the user;
   h. means for receiving user feedback in response to the proposed informons; and
   i. means for updating at least one of the first and second prediction criteria responsive to the user feedback.

58. A computer program product having a computer-readable medium with computer program logic recorded thereon for information filtering in a computer system receiving a data stream from a computer network having a plurality of users, the computer program product comprising:
   a. extraction means for identifying and extracting informons from the data stream, each of the informons having information content meeting a threshold level of relevancy, at least one of the informons being of interest to a user having a user profile, the user being a member of a network community having a community profile;
   b. filter means for adaptively filtering the informons responsive to an adaptive collaboration profile and an adaptive content profile and producing a proposed informon thereby, the informon content being filtered according to content data in the adaptive content profile and collaboration feedback data applied to the adaptive collaboration profile and related to the proposed informon, the filter means being coupled with the extraction means;
   c. communication means for conveying the proposed informon to the user and receiving a feedback response therefrom, the feedback response providing user feedback data, the communication means being coupled with the filter means;
   d. first adaptation means for adapting the content profile responsive to the feedback response, the first adaptation means being coupled to the filter means; and
   e. means for storing the adaptive collaboration profile and the adaptive content profile, the means for storing being coupled to the filter means.

59. The computer program product of claim 58 wherein the first adaptation means includes a prediction means for predicting a response of the user to a proposed informon, the prediction means receiving a plurality of temporally-spaced feedback data and predicting at least a portion of a future one of the adaptive collaboration profile and the adaptive content profile in response thereto.

60. The computer program product of claim 59 wherein the prediction means is a self-optimizing prediction means using a preselected learning technique therefor.

61. The computer program product of claim 60 wherein the preselected learning technique includes at least one of a top-key-word-selection learning technique, a nearest-neighbor learning technique, a neural network technique, a term-weighting learning technique, and a probabilistic learning technique.

62. The computer program product of claim 61 wherein the filter means further comprises means for filtering the raw informon according to an adaptive credibility profile, the adaptive credibility profile being responsive to at least one of the adaptive collaboration profile and the adaptive content profile.

63. The method of claim 5 further comprising at least one of the step of recommendation filtering and the step of consultation filtering the raw informon responsive to the feedback profile and providing a respective adaptive recommendation profile and adaptive consultation profile.

64. The method of claim 7 further comprising at least one of the step of recommendation filtering and the step of consultation filtering the raw informon responsive to the feedback profile and providing a respective adaptive recommendation profile and adaptive consultation profile.

65. The method of claim 12 further comprising at least one of the step of recommendation filtering and the step of consultation filtering the raw informon responsive to the feedback profile and providing a respective adaptive recommendation profile and adaptive consultation profile.

66. The method of claim 20 wherein:
 a. the step of prefiltering includes the step of creating a plurality of mode-invariant concept components for each of the raw informons; and
 b. the step of filtering the raw informons includes the steps of:
  (1) concept-based indexing of each of the mode-invariant concepts into a collection of indexed informons; and
  (2) creating the community profile from the collection of indexed informons.

67. The method of claim 29 further comprising at least one of the step of recommendation filtering and the step of consultation filtering the raw informon responsive to the feedback profile and providing a respective adaptive recommendation profile and adaptive consultation profile.

68. The apparatus of claim 41 wherein the filter means further comprises at least one of a recommendation filter responsive to an adaptive recommendation profile, and a consultation filter responsive to an adaptive consultation profile, each of the adaptive recommendation profile and the adaptive consultation profile being at least partially responsive to the feedback profile and the adaptive credibility profile.

69. The apparatus of claim 42 wherein:
 a. the first processor further includes means for creating a plurality of mode-invariant concept components from the raw informons;
 b. the second processor further includes means for concept-based indexing the plurality of mode-invariant concept components into a collection of indexed informons; and
 c. the second processor further includes means for creating the community profile from the collection of indexed informons.

70. The apparatus of claim 69 wherein one of the processors further comprises an interactive distributed plurality of mindpool managers having tiers between the data stream and a plurality of users, the distributed plurality successively extracting selected informons responsive to a respective tier profile, the tier profile being closest to the plurality of users being the respective member client profile, the distributed plurality extracting the proposed informon from the data stream for each respective user thereby.

71. An information processing system operable in a network having multiple sources of information, the system comprising:
 a filter structure having a content-based filter and being arranged to process an informon received from the network and to generate informon profile data representing information in the informon;
 the content-based filter having content profile data representing information including at least information desired by an individual user;
 a collaboration filter employing collaboration data obtained from users other than the individual user and related to the informon; and
 the filter structure integrating the operation of the content-based and collaboration filters by combining the informon profile data, the content profile data, and the collaboration data together and determining a value of the informon to the individual user.

72. The system of claim 71, wherein the informon profile data represents both structured and unstructured informon information and the content profile data includes structured and unstructured information.

73. The system of claim 71, wherein the content profile data represents text.

74. The system of claim 71, wherein the collaboration filter processes collaboration data which includes rating data for the informon from the other users.

75. The system of claim 71, wherein the collaboration filter processes collaboration data which includes content profile data from the other users.

76. The system of claim 74, wherein the collaboration filter further processes collaboration data which includes content profile data from the other users.

77. The system of claim 74, wherein the filter structure passes the informon to the individual user, receives input evaluative data for the informon from the individual user, and adaptively modifies the content profile data in accordance with the input evaluative data, and wherein the filter structure combines user input evaluative data received over time from users other than the individual user, for the same informon, to generate the collaboration rating data.

78. The system of claim 71 wherein the filter structure generates informon profile data which represents unstructured informon information as mode invariant concepts.

79. The system of claim 71 wherein the filter structure receives the informon from the network if the informon meets a threshold level of relevancy to users of the system.

80. The system of claim 77 wherein the filter structure passes the informon to the individual user if the informon meets a threshold level of relevancy to the individual user.

81. The system of claim 71 wherein the filter structure operates to block processing of any informon which substantially duplicates an informon previously processed by the system.

82. The system of claim 71, wherein the filter structure compares the content of the informon to the content of previously processed informons and rejects the informon if the content difference is less than a threshold delta level.

83. The system of claim 76, wherein:
 the filter structure has multiple levels;
 the content-based filter has respective subfilter structures in the respective levels, thereby being distributed from top to bottom of the filter structure;
 the subfilter structures operate to provide progressively narrower information filtering relative to user information needs from top to bottom of the filter structure; and
 the filter structure integratively processes collaboration data and subfilter content profile data in at least one of the filter structure levels, and further combines the informon profile data with the collaboration and content profile data in the one filter level in evaluating the informon for the individual user.

84. The system of claim 83 wherein the filter structure receives evaluative feedback data from the individual user in relation to the informon and processes the evaluative feedback data to update the content profile data for better prediction of the values of informons subsequently processed for the individual user.

85. The system of claim 84 wherein the user-rating collaboration data is processed in the lowest level of the filter structure, and the content-profile collaboration data is processed in at least a filter structure level above the lowest level.

86. The system of claim 85 wherein the lowest level of the filter structure is a user level where user content profiles are applied in user filters, wherein a middle level of the filter structure is a community level with each of multiple community content profiles representing user content profiles of users within the community and being applied in an associated community filter, and wherein a highest level of the filter structure is a preprocessing level with a content profile representing the community content profiles and being applied in a preprocessing filter.

87. The system of claim 86 wherein the filters in each level are embodied in one or more microprocessors with the microprocessors interconnected within levels and between levels to form an overall computer system for filter processing of informons, thereby providing facilitated scalability of the system with expansion of network user load.

88. The system of claim 87 wherein internet connections can be made between the computer system and user processors to receive feedback data from users and to transmit informon and other data to users.

89. The system of claim 71 wherein the filter structure receives user evaluative feedback data related to the informon and processes the feedback data to update the content profile data for better subsequent prediction of the values of processed informons to system users.

90. The system of claim 86 wherein the filter structure receives user evaluative feedback data related to the informon and processes the feedback data to update the content profile data used in the user, community, and preprocessing filters for better subsequent prediction of the values of processed informons to system users.

91. The system of claim 87 wherein the computer system receives user evaluative feedback data related to the informon and processes the feedback data to update the content profile data used in the microprocessors by the user, community, and preprocessing filters for better subsequent prediction of the values of processed informons to system users.

92. The system of claim 90 wherein the filter structure represents information in the informon as mode invariant concepts in the informon data.

93. The system of claim 91, wherein the collaboration data, employed at least in the community filters, includes content profile data related to the informon from users other than the individual user.

94. An information processing system operable in a network having multiple sources of information, the system comprising:
   an information filter structure having a content-based filter for users of the system;
   the information filter structure configured to generate a representation of information content of an informon received from the network;
   the content-based filter having content profile data for multiple system users including an individual user;
   a collaboration filter structure processing collaborative user data related to the informon and fed back from users other than the individual user;
   the information filter structure processing the informon representation, the current content profile data, and the collaborative user data to determine a value of the informon to the individual user, and to pass the informon for consideration by the individual user if the determined value is found to be sufficient.

95. The system of claim 94 wherein the collaboration filter structure receives rating data for the informon from users other than the individual user and processes the rating data to form the collaborative user data.

96. The system of claim 94 wherein the collaboration filter structure receives content profile data related to the informon from users other than the individual user and processes the other-user content profile data to form the collaborative user data.

97. The system of claim 95 wherein the collaboration filter structure additionally receives content profile data related to the informon from users other than the individual user and processes the other-user content profile data to form additional collaborative user data for processing in the information filter structure.

98. The system of claim 94 wherein, after the individual user considers the informon, the information filter structure further includes a feedback system for receiving evaluative data for the informon from the individual user as a basis for adaptively modifying the content profile data for subsequent filter operation.

99. The system of claim 95 wherein, after the individual user considers the informon, the information filter structure further includes a mindpool system for receiving rating data for the informon from the individual user, and for processing the individual-user rating data with prior user rating data to update the collaboration data.

100. The system of claim 94 wherein:
   the information filter structure is a multilevel structure having at least three filter levels;
   a top first level of the filter structure has a preprocessing content-based filter having system content profile data for all users and configured to generate successive representations for successively received informons;
   a second level of the filter structure having multiple community content-based filters operating with respective community content profiles for respective user communities, each community content profile having community content profile data for all member users in the corresponding community;
   the preprocessing content-based filter processing the successive informons and routing each informon which adequately matches the system content profile data to a corresponding community filter;
   a bottom or third level of the filter structure having multiple user content-based filters each operating with user content profile data; and
   the filter structure routing informons from each community filter to user filters embraced by such community filter and having informon-matching, user content profile data, and further routing matching informons from each user filter for consideration by corresponding users.

101. The system of claim 100 wherein each user filter employs member-client, content profile data to match informons to individual user clients, whereby a system user comprises one or more clients, each separate information need of any individual system user can be represented by content data in a member-client, content profile, and each of the user filters routes informons to member-client users having matching member-client, content profile data.

102. An information processing system operable in a network having multiple sources of information, the system comprising:

an information filter structure having a multilevel content-based filter for users of the system;

the information filter structure configured to generate informon content data representing information content for each informon received from the network;

the multilevel content filter having a first sublevel content-based filter having first content profile data in a top level of the information filter structure for preprocessing informons and generating raw informons which have sufficient relevancy to be considered by system users;

the multilevel content filter having a bottom sublevel content-based filter having user content profile data in a bottom level of the information filter structure for processing received informons and directing the received informons to system users according to the user content profile data; and the multilevel content filter structure having at least a third sublevel content filter having third content profile data in a level between the top level and the bottom level of the information filter structure for processing raw informons and routing the raw informons for processing by the bottom sublevel content-based filter.

103. The system of claim 102, wherein the multilevel filter structure has three levels, the third sublevel content-based filter directly transmitting passed informons to the bottom sublevel content-based filter.

104. The system of claim 103 wherein the third content profile data includes community content data for multiple communities of users wherein each community contains users who have similar information needs and wherein the associated content profile data represents the combined information needs of the users in the community.

105. The system of claim 104, wherein collaborative data related to a current informon being processed for an individual user is combined with the user content profile data to determine a value of the current informon to the individual user.

106. The system of claim 105, wherein collaborative data is rating data.

107. The system of claim 102 wherein the information filter structure receives feedback evaluative data for the informons from users to whom the informons are routed, and adaptively modifies the first, third, and user content profile data in accordance with associated feedback data to improve subsequent filter operation in predicting values of informons to system users.

108. The system of claim 104, wherein the information filter structure receives feedback evaluative data for the informons from users to whom the informons are routed, and adaptively modifies the first, community, and user content profile data in accordance with associated evaluative feedback data to improve subsequent filter operation in predicting values of informons to system users.

109. The system of claim 105, wherein the information filter structure receives evaluative feedback data for the informons from users to whom the informons are routed, and adaptively modifies the first, community, and user content profile data in accordance with associated evaluative feedback data to improve subsequent filter operation in predicting values of informons to system users.

110. An information processing system operable in a network having multiple sources of information, the system comprising:

a filter structure having a content-based filter and being arranged to process an informon from the network and to generate informon profile data representing information in the informon;

the content-based filter having content profile data characterizing classifiable information;

a collaboration filter employing collaboration data obtained from system users and related to the classifiable information;

the filter structure integrating the operation of the content-based and collaboration filters by combining the informon profile data, the content profile data, and the collaboration data and classifying the information for at least one purpose.

111. The system of claim 110, wherein the filter structure receives evaluative feedback data related to the informon and processes the feedback data to update at least one of the collaboration data and the content profile data for better subsequent classification of processed informons in satisfying the one purpose.

112. The system of claim 111, wherein:

the filter structure has multiple levels;

the content-based filter has respective subfilter structures in the respective filter levels, thereby being distributed from top to bottom of the filter structure;

the subfilter structures operate to provide progressively narrower information filtering from top to bottom of the filter structure; and the filter structure combines collaboration data and content profile data in at least one of the filter levels, and further combines the informon profile data with the collaboration and content profile data in the one filter level to output classified information for the one purpose.

113. The system of claim 112 wherein the filter structure combines collaboration data and content profile data in at least one additional filter level.

114. An information processing system operable in a network having multiple sources of information, the system comprising:

means for receiving informons from the network and generating informon profile data representing information in the informons;

means for generating content profile data representing information including information desired by an individual user;

means for selecting a current informon for processing at least in accordance with the content profile data and the informon profile data;

means for generating collaboration data including rating data obtained from users other than the individual user; and means for processing in combination the informon profile data for the current informon, the content profile data, and the collaboration data to determine a value of the current informon relative to the information desired by the individual user.

115. The system of claim 114, wherein the generating means operate in multiple filter levels to provide sequenced, increasingly narrow informon filtering from filter level to filter level.

116. The system of claim 114, wherein the collaboration data further includes collaborative content profile data received from users other than the individual user and related to the information desired by the current user, and the selecting means further employs the collaborative content profile data in selecting the current informon.

117. The system of claim 114 wherein means are provided for receiving evaluative feedback data from the individual user in relation to the current informon and for adaptively modifying the content profile data for better prediction of the values of informons subsequently processed for the individual user.

118. An information processing system operable in a network having multiple sources of information, the system comprising:
- means for generating informon content profile data representing information content for each informon received from the network;
- means for prefiltering received informons in a top information filter level of the system using preprocessing content profile data representing information desired by system users; the prefiltering means generating raw informons according to the preprocessing content profile data and the informon content profile data;
- first means for filtering generated raw informons using content profile data sets for respective multiple groups of users in at least one additional information filter level of the system downward from the top information filter level; the first filtering means routing the raw informons from user groups for individual user filtering; and
- second means for filtering user routed informons using content profile data sets for respective user member clients in a bottom information filter level of the system and passing the user routed informons to user member clients.

119. The system of claim 118 wherein collaborative rating data related to a current informon being processed for an individual user is combined with the user content profile data to determine a value of the current informon to the individual user.

120. The system of claim 118 wherein means are provided for receiving evaluative feedback data for informons from users to whom the informons have been routed, and for adaptively modifying the preprocessing content profile data and the content profile data for each responding user in accordance with associated evaluative feedback data to improve subsequent filtering in predicting values of informons to the responding system users.

121. The system of claim 119 wherein means are provided for receiving evaluative feedback data for informons from users to whom the informons have been routed, and for adaptively modifying the preprocessing content profile data and the content profile data for each responding user in accordance with associated evaluative feedback data to improve subsequent filtering in predicting values of informons to the responding system users.

122. An information processing system operable in a network having multiple sources of information, the system comprising:
- means for receiving informons from the network and for generating informon profile data representing information in the informons;
- first means for filtering the informons on the basis of content profile data characterizing classifiable information;
- second means for filtering the informons on the basis of collaboration data obtained from system users and related to the classifiable information; and
- the first and second filtering means operating together to combine the informon profile data, the content profile data, and the collaboration data and classifying the information for at least one purpose.

123. The system of claim 122 wherein means are provided for receiving evaluative feedback data related to the informons and for processing the feedback data to update at least one of the collaboration data and the content profile data for better subsequent classification of processed informons in satisfying the one purpose.

124. A method for operating an information processing system in a network having multiple sources of information, the steps of the method comprising:
- operating a filter structure to process an informon received from the network and to generate informon profile data representing information in the informon;
- employing a content-based filter in the filter structure as a basis for filtering informon information relative to content profile data which represents information including at least information desired by an individual end user;
- employing a collaboration filter in the filter structure as a basis for filtering informon information relative to collaboration data obtained from users other than the individual user; and
- operating the content-based and collaboration filters together to combine the informon profile data, the content profile data and the collaboration data in determining a value of the informon to the individual user.

125. The method of claim 124, wherein the collaboration data includes at least one of other user rating data and other user content profile data.

126. The method of claim 124, wherein the steps of the method further include:
- receiving user evaluative feedback data from the individual user and processing the evaluative feedback data to update the content profile data for better prediction of the values of informons subsequently processed for the individual user.

127. The method of claim 126, wherein the collaboration data includes other user rating data, and successive units of evaluative feedback data, received from multiple users over time in relation to the informon, are used to update the rating data.

128. A method for operating an information processing system in a network having multiple sources of information, the steps of the method comprising:
- receiving informons from the network and generating informon profile data representing information in the informons;
- generating content profile data representing information including information desired by an individual end user;
- selecting a current informon for processing at least in accordance with the content profile data and the informon profile data;
- generating collaboration data obtained from users other than the individual user; and
- processing in combination the informon profile data, the content profile data, and the collaboration data to determine a value of the current informon relative to the information desired by the individual user.

129. The method of claim 128, wherein the collaboration data includes informon rating data received from users other than the individual user and related to the information desired by the individual user.

130. The method of claim 129, wherein the collaboration data further includes collaborative content profile data selectively obtained from users other than the individual user and related to the information desired by the individual user.

131. The method of claim 128, wherein the steps further include receiving evaluative feedback data from the individual user in relation to the current informon and adaptively modifying the content profile data for better prediction of the values of informons subsequently processed for the individual user.

132. The method of claim 131, wherein the network is an internet, and the informon receiving and selecting steps, the generating and processing steps, and the feedback data receiving and modifying steps are performed by an information processing computer system, with the computer system coupled through the internet to an information processing unit of the individual user.

133. A method for operating an information processing system in a network having multiple sources of information, the steps of the method comprising:

generating informon content profile data for each informon received from the network;

prefiltering received informons in a top information filter level of the system using preprocessing information content profile data representing information desired by system users, and generating raw informons according to the preprocessing content profile data and the informon content profile data;

filtering generated informons using content profile data sets for respective groups of users in at least one additional information filter level of the system downward from the top information filter level, and routing the informons from user groups for individual user filtering; and filtering user routed informons using content profile data sets for respective user member clients in a bottom filter level of the system and passing the user routed informons to user member clients.

134. The method of claim 133, wherein the steps further include the step of combining the user content profile data with collaboration data related to a current informon being processed for an individual user in determining a value of the current informon to the individual user.

135. The method of claim 133, wherein the steps further include receiving evaluative feedback data for informons from users to whom the informons have been routed, and for adaptively modifying the preprocessing content profile data and the user and user-group content profile data sets in accordance with user-associated evaluative feedback data to improve subsequent filtering in predicting values of informons to system users.

136. The method of claim 133, wherein a computer system is employed for execution of the generating, prefiltering and filtering steps, with the computer system formed by a network of interconnected microprocessors and with each filter level having respective pluralities of the microprocessors thereby facilitating system scalability to increasing system load by enabling each filter level to be expanded in filter capacity by interconnection of additional microprocessors at each filter level.

137. A method for operating an information processing system in a network having multiple sources of information, the steps of the method comprising:

receiving informons from the network and generating informon profile data representing information in the informons;

filtering the informons on the basis of content profile data characterizing classifiable information;

filtering the informons on the basis of collaboration data obtained from system users and related to the classifiable information; and performing the operation of the content profile data and collaboration data filtering steps to combine the informon profile data, the content profile data, and the collaboration data and classify the information for at least one purpose.

138. The method of claim 137, wherein the steps further include the step of receiving evaluative feedback data related to the informons and processing the feedback data to update at least one of the collaboration data and the content profile data for better subsequent classification of processed information in satisfying the one purpose.

* * * * *